(12) United States Patent
Tse

(10) Patent No.: US 9,255,168 B2
(45) Date of Patent: Feb. 9, 2016

(54) HIGHLY BRANCHED COMPOSITIONS AND PROCESSES FOR THE PRODUCTION THEREOF

(71) Applicant: ExxonMobil Chemical Patents Inc., Baytown, TX (US)

(72) Inventor: Mun F. Tse, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 83 days.

(21) Appl. No.: 13/954,268

(22) Filed: Jul. 30, 2013

(65) Prior Publication Data

US 2014/0051808 A1  Feb. 20, 2014

Related U.S. Application Data

(60) Provisional application No. 61/683,892, filed on Aug. 16, 2012, provisional application No. 61/683,900, filed on Aug. 16, 2012.

(51) Int. Cl.
| | |
|---|---|
| *C08F 255/00* | (2006.01) |
| *C08L 23/06* | (2006.01) |
| *C08L 23/14* | (2006.01) |
| *C08L 25/04* | (2006.01) |
| *C08F 236/20* | (2006.01) |
| *C08F 279/02* | (2006.01) |
| *C08L 9/00* | (2006.01) |
| *C08F 255/02* | (2006.01) |

(52) U.S. Cl.
CPC ............ *C08F 255/00* (2013.01); *C08F 236/20* (2013.01); *C08F 255/02* (2013.01); *C08F 279/02* (2013.01); *C08L 9/00* (2013.01); *C08L 23/06* (2013.01); *C08L 23/14* (2013.01); *C08L 25/04* (2013.01)

(58) Field of Classification Search
None
See application file for complete search history.

(56) References Cited

U.S. PATENT DOCUMENTS

| 4,470,910 | A | 9/1984 | Quemerais et al. |
|---|---|---|---|
| 5,378,764 | A | 1/1995 | Benham et al. |
| 7,338,994 | B2 | 3/2008 | Walton et al. |
| 2004/0118762 | A1 | 6/2004 | Xu et al. |
| 2008/0099402 | A1 | 5/2008 | Witt et al. |
| 2009/0286024 | A1 | 11/2009 | Lu et al. |
| 2010/0168330 | A1 | 7/2010 | Demoirors et al. |
| 2010/0280206 | A1 | 11/2010 | Follestad et al. |
| 2011/0136982 | A1* | 6/2011 | Tse et al. ............... 525/240 |
| 2011/0210056 | A1 | 9/2011 | Linford et al. |
| 2011/0278228 | A1 | 11/2011 | Thurbide |

FOREIGN PATENT DOCUMENTS

| EP | 0 856 546 | 8/1998 |
|---|---|---|
| WO | 2000/000520 | 1/2000 |
| WO | 2007/061593 | 5/2007 |

OTHER PUBLICATIONS

Sun, T., et al. "Effect of Short Chain Branching on the Coil Dimensions of Polyolefins in Dilute Solution", Macromolecules, 2001, vol. 34, No. 19, pp. 6812-6820.

* cited by examiner

*Primary Examiner* — Jeffrey Mullis

(57) ABSTRACT

A highly branched polyolefin having olefin derived units; wherein the highly branched polyolefin has: (i) a branching index, g'(vis), of less than about 0.9; (ii) a phase angle, δ, of less than about 55 degrees at a complex modulus of 10 kPa, measured at 190° C.; (iii) a gel content of less than or equal to about 10%; and (iv) a melting point of less than about 135° C.; wherein the highly branched polyolefin is obtained by contacting one or more polyolefins with a free radical generator. The highly branched polyolefin may also comprise a modifying polymer, wherein the modifying polymer may be the similar or dissimilar to the polyolefin. Methods of producing these highly branched polyolefins and blends of these highly branched polyolefins are also disclosed.

18 Claims, 9 Drawing Sheets

HIGHLY BRANCHED COMPOSITIONS AND PROCESSES FOR THE PRODUCTION THEREOF

PRIORITY CLAIM

The present application claims priority to U.S. Application Ser. Nos. 61/683,892, filed on Aug. 16, 2012, and U.S. Application Ser. No. 61/683,900, filed on Aug. 16, 2012, both of which are herein incorporated by reference.

FIELD OF THE INVENTION

Embodiments provided herein generally relate to polyolefins and blends thereof. More particularly, embodiments provided herein relate to highly branched polyolefins, blends thereof, and processes for producing the same.

BACKGROUND OF THE INVENTION

Polymer blends have widespread technological importance because they offer a strong analogy to the copolymerization as blends are also a means of combining the unique properties of the constitutive polymer species. However, Paul Flory, Nobel Prize winner in polymer chemistry, has commented that " . . . incompatibility of chemically dissimilar polymers is observed to be the rule and compatibility the exception." Therefore, there has been a tremendous amount of research and development in block and graft copolymers because these copolymers are generally regarded as chemically linked homopolymers. These materials show good physical properties but they tend to be more expensive, often requiring an additional hydrogenation step to improve the polymer stability. Therefore, there is always a need to make chemically linked polymers that exhibit some of the properties of the component polymers in an economic way.

These chemically linked polymers may have improved melt elasticity and processability, and may be used as a compatibilizer for a polymer blend, thereby improving its properties. Varied applications exist for such property improvements, for example, blown film and thermoforming applications. Billions of pounds of polyethylene (PE) are annually processed by blown film extrusion techniques to produce grocery sacks and trash can liners. Linear low density polyethylene (LLDPE), in particular, shows good bubble stability and the resulting film is suitable for many applications. Overall, LLDPE has a narrow molecular weight distribution (MWD=Mw/Mn) and better down-gauging and optical properties, however impact strength is not optimal. Also, there are many challenges in the film blowing process of LLDPE. Most LLDPEs have higher MWs but narrower MWDs, and the short chain branching (SCB) of LLDPEs does not usually provide shear thinning. LLDPE is therefore undesirably viscous at the high shear rates when processed in an extruder and die. The more viscous LLDPE may also increase screw torque, barrel wear, melt temperature, and occurrences of sharkskin at the die exit. At the same time, LLDPE typically shows lower extensional stresses at low strain rates occurring in the molten tube and bubble inflation regions, resulting in a higher chance of bubble instability. One of the primary objectives of the blown film process is to produce a thin film with a uniform gauge and good optical and mechanical properties, and to avoid any gels and foreign and unmelted materials in the extruded, drawn film. Accordingly, the blown film industry continues to have a need for a polyethylene material with a balanced melt strength and drawn speed to break, with the capability of being shear thinned, and free of gels.

In the plastic fabrication industry, a variety of resins may be used, and typically include: polypropylene (PP), general purpose polystyrene (GPPS), polycarbonate (PC), acrylonitrile-butadiene-styrene (ABS), and nylon (also known as polyamide, or PA). Injection molding is one of the primary plastic fabrication techniques for rapidly creating large quantities of plastic articles ranging from disposable food containers to high precision engineering components. This plastic fabrication method is distinguished from others by using injection and a hollow mold form to shape the final article. Polymers exhibiting shear thinning behaviors are highly desirable because they can be easily processed in high shear rate fabrication methods, such as injection molding. Accordingly, there is a need for polymers and polymer blends that exhibit good shear thinning behavior in injection molding fabrication processes.

Thermoforming is the process of heating a solid plastic article, mostly in the sheet form, to a temperature where it softens but does not flow, then reshaping it. This process has a large cost advantage over injection molding because of the less expensive mold and lower energy consumption. Thin-gauge sheet or film is used in thermoforming to produce disposable/recyclable food, medical and general retail products such as containers, cups, lids, and trays. Thick-gauge sheet is used to produce larger, usually more permanent, items such as plastic pallet, truck beds, and spas. The buildup of slack in the heated sheet, however, needs to be avoided in the thermoforming process. Also, it is desirable to thermoform polyolefins having high melt strength or melt elasticity. Accordingly, there is a need for materials with improved melt strength or elasticity, and improved sagging resistance for applications such as thermoforming.

U.S. Pat. No. 7,338,994 discloses rheology-modified, gel-free thermoplastic elastomer compositions comprising a melt blend of an ethylene/α-olefin polymer and a high melting polymer such as polypropylene or a propylene/α-olefin copolymer wherein the rheology modification is induced by a combination of a peroxide and a free radical coagent in a peroxide:coagent ratio of 1:4 to 1:20 and a maximum peroxide concentration of 0.075 wt %. The resulting compositions have an elastomeric phase, a non-elastomeric phase, and certain physical properties that exceed those of a like composition that is rheology-modified by peroxide alone or peroxide and coagent in a 1:2 to 2:1 ratio. The compositions are used to make a variety of articles of manufacture, such as tubing and weather-stripping, via calendaring, extrusion, and molding techniques such as blow molding.

There remains a need for new chemically linked polymers, and blends thereof, that exhibit some of the properties of the component polymers, having utility in various applications such as blown film and thermoforming.

SUMMARY OF THE INVENTION

This invention relates to a highly branched polyolefin, comprising: olefin derived units; wherein the highly branched polyolefin has: (i) a branching index, g'(vis) of less than about 0.9; (ii) a phase angle, δ, of less than about 55 degrees at a complex modulus of 10 kPa, measured at 190° C.; (iii) a gel content of less than or equal to about 10%; and (iv) a melting point of less than about 135° C.; wherein the highly branched polyolefin is obtained by contacting one or more polyolefins with a free radical generator.

This invention also relates to processes to produce a highly branched polyolefin comprising:
(i) contacting:
(a) from about 96 wt % to about 100 wt % of a polyolefin having a g'(vis) of greater than 0.98, based on the total weight of polymers and multifunctional monomers;
(b) from 0 wt % to about 4 wt % of a multifunctional monomer, based on the total weight of polymers and multifunctional monomers;
(c) at least 0.1 wt % of a free radical generator, based on the total weight of polymers and multifunctional monomers; and
(ii) obtaining a highly branched polyolefin;
wherein the highly branched polyolefin has: (i) a branching index, g'(vis), of less than about 0.9; (ii) a phase angle, δ, of less than about 55 degrees at a complex modulus of 10 kPa, measured at 190° C.; (iii) a gel content of less than or equal to about 10%; and (iv) a melting point of less than about 135° C.

This invention also relates to a homogenous polymer blend comprising:
(i) from about 1 wt % to about 90 wt % of a highly branched polyolefin, based on the total weight of polymers in the blend;
(ii) from about 10 wt % to about 99 wt % of a base polymer comprising a $C_2$ to $C_{20}$ polyalphaolefin; wherein the base polymer has a g' (vis) of greater than 0.91;
wherein the highly branched polyolefin has:
(i) a branching index, g'(vis), of less than about 0.9;
(ii) a phase angle, δ, of less than about 55 degrees at a complex modulus of 10 kPa, measured at 190° C.;
(iii) a gel content of less than or equal to about 10%; and
(iv) a melting point of less than about 135° C.

This invention also relates to a homogeneous polymer blend comprising:
(i) from about 10 wt % to about 99 wt % of polyethylene, based on the total weight of polymers in the blend;
(ii) from about 1 wt % to about 90 wt % of a highly branched polyethylene, based on the total weight of polymers in the blend; and
(iii) from 0 wt % to about 89 wt % of a highly branched copolymer of polyethylene and a dissimilar polymer, based on the total weight of polymers in the blend.

This invention also relates to a process to produce a highly branched polyolefin comprising:
(i) contacting:
(a) from about 96 wt % to about 100 wt % of a polyolefin has a g' of >0.90, based on the total weight of polymers and multifunctional monomers;
(b) from 0 wt % to about 4 wt % of a multifunctional monomer, based on the total weight of polymers and multifunctional monomers;
(c) at least 0.1 wt % of a free radical generator, based on the total weight of polymers and multifunctional monomers;
(ii) obtaining a highly branched polyolefin;
wherein the highly branched polyolefin has:
(i) a branching index, g'(vis), of less than about 0.9;
(ii) a phase angle, δ, of less than about 55 degrees at a complex modulus of 10 kPa, measured at 190° C.;
(iii) a gel content of less than or equal to about 10%; and
(iv) a melting point of less than about 135° C.

DETAILED DESCRIPTION

Figure 1:
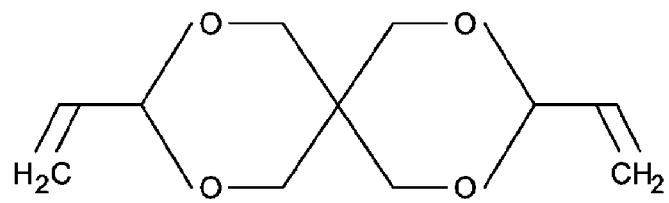
FIG. 1 represents the structure of DVTU (melting point>RT).
Figure 2:
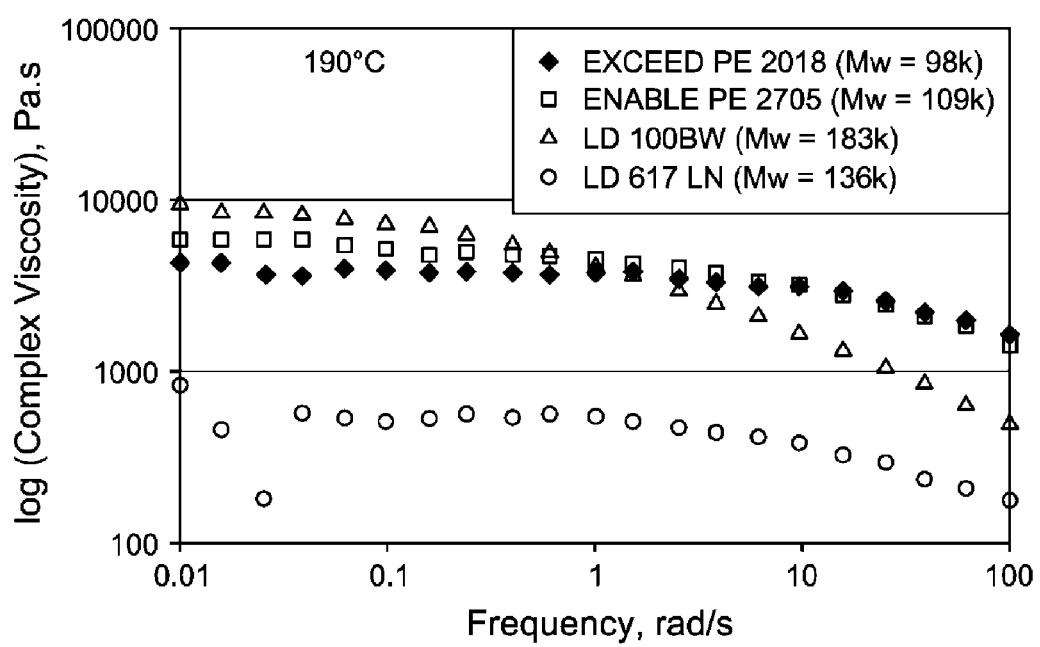
FIG. 2 depicts the complex viscosity versus frequency plots of certain PE materials at 190° C.

The inventors have surprisingly discovered new highly branched polyolefins which may be produced by the reactive blending of one or more (preferably linear) polyolefins in the presence of a free radical generator and, optionally, one or more multifunctional monomers. The component polyolefins are covalently linked to produce a highly branched polyolefin having a branching index, g'(vis), lower than any of the starting material polyolefins.

These new highly branched polyolefins may be of several different types, depending on the starting material polyolefin. Firstly, the highly branched polymer may be produced from a single linear polymer, such as high density polyethylene or linear low density polyethylene (LLDPE). Secondly, the highly branched polymer may be produced from two or more polymers having the same monomer units, for example, from an ethylene/hexene copolymer having 97 wt % ethylene derived units and an ethylene/hexene copolymer having 94 wt % ethylene derived units. Thirdly, the highly branched polymer may be produced from two dissimilar polymers. For ease of distinction, by "dissimilar" it is meant that the polymers are chemically incompatible so as to be wholly or at least partially immiscible when physically blended together. The dissimilar polymers may include an ethylene polymer or a copolymer with a propylene polymer or copolymer; an ethylene polymer or copolymer with a styrenic polymer or copolymer; or a propylene polymer or copolymer with a styrenic polymer or copolymer. Specific examples may include low density polyethylene (LDPE) and polypropylene (PP); LDPE and polystyrene; LLDPE and PP; LLDPE and polystyrene; high density polyethylene (HDPE) and PP; HDPE and polystyrene; and VISTAMAXX™ copolymer and polystyrene.

These highly branched polyolefins may be used alone as a new polymer or as a new thermoplastic elastomer (TPE). Alternately, the highly branched polyolefins may also be blended with other polymers, copolymers, or polyblends as a modifier or compatibilizer in order to improve properties, such as melt elasticity and shear thinning. These new highly branched polyolefins and their blends may be useful in various applications, such as blown films and thermoforming applications.

Each of the highly branched polyolefins, processes to produce them, and blends of the highly branched polymer are discussed below.

DEFINITIONS

Definitions applicable to the presently described invention are as described below.

An "elastomer" includes all natural and synthetic rubbers, including those consistent with the ASTM D1566-11 definition: "a material that is capable of recovering from large deformations quickly and forcibly, and can be, or already is, modified to a state in which it is essentially insoluble (but can swell) in boiling solvent, such as benzene, methyl ethyl ketone, or ethanol-toluene azeotrope." Examples of preferred elastomers include, but are not limited to, ethylene propylene rubber, ethylene propylene diene monomer rubber, styrenic block copolymer rubbers (including SI, SIS, SB, SBS, SiBS, SEPS, SEBS, and the like, where S=styrene, I=isoprene, B=butadiene, iB=isobutylene, EP=ethylene propylene, and EB=ethylene butene-1), butyl rubber, halobutyl rubber, copolymers of isobutylene and para-alkylstyrene, halogenated copolymers of isobutylene and para-alkylstyrene, natural rubber (NR), polyisoprene, copolymers of butadiene with acrylonitrile, copolymers of butadiene with styrene (SBR), polychloroprene, alkyl acrylate rubber, chlorinated isoprene rubber, acrylonitrile chlorinated isoprene rubber, and polybutadiene rubber (both cis and trans). Elastomer is a term that may be used interchangeably with the term rubber. Elastomeric composition refers to any composition comprising at least one elastomer as defined above.

As used herein, Mn is number average molecular weight as determined by High Temperature Size Exclusion Chromatography (SEC), Mw is weight average molecular weight as determined by SEC, and Mz is z average molecular weight as also determined by SEC. Molecular weight distribution (MWD) is defined to be Mw divided by Mn.

As used herein, "wt %" means weight percent, "mol %" means mole percent, "vol %" means volume percent, and all molecular weights, e.g., Mw, Mn, Mz, are in units of g/mol, unless otherwise noted. Furthermore, all molecular weights are Mw unless otherwise noted.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. For purposes herein, a "polymer chain" or "polymeric chain" comprises a concatenation of carbon atoms bonded to each other in a linear or a branched chain, which is referred to herein as the backbone of the polymer (e.g., polyethylene).

As used herein, when a polymer is referred to as comprising a monomer, the monomer is present in the polymer in the polymerized form of the monomer or in the derivative form of the monomer. The term "derived units" as used herein, refers to the polymerized form of the monomer from which the polymer was derived. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. Furthermore, polyethylene comprises ethylene derived units, a terpolymer of propylene/ethylene/butene comprises propylene derived units, ethylene derived units and butene derived units, and so on.

As used herein, the terms "linear low density polyethylene" and "LLDPE" refer to a polyethylene homopolymer or, preferably, copolymer having a density of from about 0.910 $g/cm^3$ to about 0.945 $g/cm^3$.

Highly Branched Polyolefins

This invention relates to a highly branched polyolefin, comprising: olefin derived units; wherein the highly branched polyolefin has:

(i) a branching index, g'(vis) of less than 0.90 (preferably less than about 0.85; preferably less than 0.80; less than 0.7; less than 0.6; less than 0.5, less than 0.4; less than 0.3);

(ii) a phase angle, δ, of less than about 55 degrees (preferably less than about 50 degrees; preferably less than about 45 degrees) at a complex modulus of 10 kPa, measured at 190° C.;

(iii) a gel content of less than or equal to about 10% (preferably less than about 8 wt %, less than about 6 wt %, less than about 4 wt %, less than about 1 wt %); and (iv) a melting point of less than about 135° C. (preferably less than about 120° C.; preferably less than about 110° C., preferably less than 105° C., preferably less than 100° C., preferably less than 95° C., preferably less than 90° C., preferably less than 85° C., preferably less than 80° C., preferably less than 75° C., preferably less than 70° C., and preferably less than 60° C.); and wherein the highly branched polyolefin is obtained by contacting one or more polyolefins with a free radical generator; optionally, the highly branched polyolefin is obtained by contacting the one or more polyolefins with a modifying polymer and a free radical generator;

wherein the modifying polymer is similar to the polyolefin (or alternately, the modifying polymer is dissimilar to the polyolefin, where dissimilar means that the polymers are chemically incompatible so as to be wholly or at least partially immiscible when physically blended together).

Embodiments of this invention relate to "highly branched" polyolefins, which means long chain branched or branch-on-branch polyolefins. Without wishing to be bound by theory, it is thought that the reactive species of the free radical generator abstracts a proton from the backbone of the polyolefin, thereby generating a polyolefin radical. Two polyolefin radicals may combine to produce the highly branched polymers of this invention. In preferred embodiments of this invention, the reactive species of the free radical generator may add to the multifunctional monomer, thereby producing a multifunctional monomer free radical. A polyolefin free radical and a multifunctional monomer free radical may then combine to produce the highly branched polymers of this invention. This branching is characterized by a branching index, g'(vis) in the range of from about 0.10 to 0.90. Polyolefins having a g'(vis) of 0.2 or less are considered hyperbranched.

The highly branched polyolefin comprises olefin derived units (derived from the polyolefin starting material, optionally the polyolefin starting material has a branching index, g'(vis), of greater than 0.98). The polyolefin starting materials are discussed in more detail below.

The highly branched polyolefins may, optionally, further comprise a modifying polymer (optionally the modifying polymer preferably has a branching index of greater than 0.98). Modifying polymers are different from the polyolefin, is used as a precursor polymer to produce the highly branched polymers of this invention. Indeed, the polyolefin and the modifying polymer may be thought of as comonomers (or as comacromonomers or "comacromers") for the highly branched composition. It is within the scope of the invention to use second and third polymers as termonomers and tetramonomers, and the like, to produce these highly branched compositions. Modifying polymers are discussed in more detail below.

The highly branched polyolefins of this invention may further comprise: at least one multi-functional monomer derived unit selected from the group consisting of one or more vinyl compounds, allylic compounds, acrylate compounds, and combinations thereof. The highly branched polymer may comprise from 0 wt % to 4 wt % (preferably from about 0.5 wt % to about 3.5 wt %; preferably about 0.5 wt % to about 3 wt %; preferably about 1 wt % to about 2.5 wt %; preferably about 1.5 wt % to about 2 wt %) multifunctional monomer derived units, based on the total weight of the polymers and multifunctional monomers. In preferred embodiments of this invention, the highly branched polymer comprises 0 wt % to about 1 wt % (preferably 0 wt % to about 0.5 wt %, preferably 0 wt % to about 0.2 wt %, preferably 0 wt % to about 0.15 wt %) multifunctional monomer derived units, based on the total weight of the polymers and multifunctional monomers. As used herein, "multifunctional monomer derived units" means that the multifunctional monomer is present in its polymerized form in the highly branched polymer. The multifunctional monomer is discussed in more detail below.

In some embodiments, the highly branched polyolefins comprise residual free radical generator. In other embodiments, the residual free radical generator is removed, for example, by drying of the polymer at high temperature, under vacuum. The free radical generator is discussed in more detail below.

Properties of Highly Branched Compositions

The highly branched polyolefins of this invention have a new and useful combination of properties that are more desirable than the polyolefin starting materials. These properties comprise:

(i) a branching index, g'(vis) of less than about 0.9 (preferably less than about 0.85; preferably less than about 0.80; preferably less than about 0.7; preferably less than about 0.6; preferably less than about 0.5; preferably less than about 0.4; preferably less than about 0.3);

(ii) a phase angle, δ, of less than about 55 degrees (preferably less than about 50 degrees; preferably less than about 45 degrees) at a complex modulus of 10 kPa, measured at 190° C.;

(iii) a gel content of less than or equal to about 10% (preferably less than about 8 wt %, preferably less than about 6 wt %, preferably less than about 4 wt %, preferably less than about 1 wt %);

(iv) a melting point of less than about 135° C. (preferably less than about 120° C.; preferably less than about 110° C.; preferably less than about 105° C., preferably less than about 100° C., preferably less than about 95° C., preferably less than about 90° C., preferably less than about 85° C., preferably less than about 80° C., preferably less than about 75° C., preferably less than about 70° C., and preferably less than about 60° C.);

(v) optionally, a heat of fusion of less than about 190° C. (preferably less than about 160° C.; preferably less than about 130° C.; preferably less than about 120° C.; preferably less than about 110° C., preferably less than about 105° C., preferably less than about 100° C., preferably less than about 95° C., preferably less than about 90° C., preferably less than about 85° C., preferably less than about 80° C., preferably less than about 75° C., preferably less than about 70° C., and preferably less than about 60° C.);

(vi) optionally, a Tc of less than about 115° C. (preferably less than about 105° C., preferably less than about 95° C., preferably less than about 90° C., preferably less than about 85° C., preferably less than about 80° C., or preferably less than about 75° C.);

(vii) optionally, a tensile strength greater than 15 MPa (preferably greater than 20 MPa, preferably greater than 30 MPa);

(viii) optionally, an elongation at break greater than 10% (preferably greater than 20%, preferably greater than 50%, preferably greater than 100%, preferably greater than 150%, preferably greater than 200%, preferably greater than 300%);

(ix) optionally, a tensile strength at 100% elongation greater than 8 MPa (preferably greater than 10 MPa, preferably greater than 12 MPa);

(x) optionally, a tensile strength above 8 MPa, preferably a tensile strength above 10 MPa, and/or an elongation at break of at least 600%, preferably at least 700%, preferably at least 800%, and preferably at least 900%;

(xi) optionally, a toughness of 1.5 MJ/m$^3$ or more, preferably 10 MJ/m$^3$ or more, preferably 15 MJ/m$^3$ or more;

(xii) optionally, a density in a range of from 0.840 g/cm$^3$ to 0.940 g/cm$^3$ (preferably from 0.850 g/cm$^3$ to 0.93 g/cm$^3$, preferably from 0.850 g/cm$^3$ to 0.920 g/cm$^3$, preferably from 0.860 g/cm$^3$ to 0.930 g/cm$^3$, preferably from 0.870 g/cm$^3$ to 0.92 g/cm$^3$, and, optionally, from less than 0.925 g/cm$^3$, preferably less than 0.920 g/cm$^{3t}$ and preferably less than 0.900 g/cm$^3$); and (xiii) optionally, a bulk density of from 0.400 g/cm$^3$ to 0.900 g/cm$^3$ (preferably from 0.420 g/cm$^3$ to 0.800 g/cm$^3$, preferably from 0.430 g/cm$^3$ to 0.500 g/cm$^3$, and preferably from 0.440 g/cm$^3$ to 0.60 g/cm$^3$).

The highly branched polyolefin has a branching index, g'(vis) of less than about 0.9 (preferably less than about 0.85, preferably less than about 0.80, preferably less than about 0.7, preferably less than about 0.6, preferably less than about 0.5, preferably less than about 0.4, preferably less than about 0.3). Branching index (g'(vis)) is determined as described in U.S. Patent Application Publication No. 2006/0173123, particularly pages 24-25. In the event there is a conflict between the size exclusion chromatography method described in 2006/0173123 and the size exclusion chromatography method described below, the method described in 2006/0173123 shall be used for determination of g'(vis).

The highly branched polyolefin has a phase angle, δ, of less than about 55 degrees (preferably less than about 50 degrees; preferably less than about 45 degrees) at a complex modulus of 10 kPa, measured at 190° C. Phase angle is measured as follows. Polymers or blends are compression-molded into plaques with a thickness of about 2 mm. A press at 180° C., a molding time of 15 min, and a press force of 25 tons (22.6 Mg) is used. A circular sample with a diameter of 25 mm is die-cut from the compression-molded plaque with a thickness of about 2 mm. The sample is mounted between the 25-mm diameter parallel plates in a Rheometric Scientific ARES Analyzer (Piscataway, N.J.). The test temperature is 190° C. and the strain applied is 10%. The complex modulus (G*), the phase angle (δ), and the complex viscosity (η*) are measured as the frequency is varied from 0.01 to 100 rad/s. The phase or loss angle δ, is the inverse tangent of the ratio of G" (the shear loss modulus) to G' (the shear storage modulus). For a typical linear polymer, the phase angle at low frequencies (or long times) approaches 90° because the chains can relax in the melt, adsorbing energy and making G" much larger than G'. As frequencies increase, more of the chains relax too slowly to absorb energy during the shear oscillations, and G' grows relative to G". Eventually, G' and G" become equal and the phase angle reaches 45°. In contrast, a branched chain polymer relaxes very slowly even at temperatures well above the melting temperature of the polymer, because the branches need to retract before the chain backbone can relax along its tube in the melt. This polymer never reaches a state where all its chains can relax during a shear oscillation, and the phase angle never reaches 90° even at the lowest frequency, ω, of the experiments. The phase angle is also relatively independent of the frequency of the oscillations in the small-strain rheology experiment; another indication that the chains cannot relax on these timescales. These slowly relaxing chains lead to a higher zero shear viscosity. Long relaxation times lead to a higher polymer melt strength or elasticity.

The highly branched polyolefin has a gel content of less than or equal to about 10% (preferably less than about 8 wt %, preferably less than about 6 wt %, preferably less than about 4 wt %, preferably less than about 1 wt %). Gel content is determined using a High Temperature Size Exclusion Chromatograph (SEC), equipped with a differential refractive index detector (DRI), an online light scattering detector (LS), and a viscometer. Experimental details not described below, including how the detectors are calibrated, are described in: T. Sun, P. Brant, R. R. Chance, and W. W. Graessley, Macromolecules, Volume 34, Number 19, 6812-6820, (2001). Percent gel is determined from the inject mass and the mass calculated from the DRI response, as follows: % gel=[(inject mass)−(mass calculated from the DRI response)]/(inject mass). The inject mass is the original mass of the polymer used to prepare the TCB polymer solution. Then the TCB polymer solution will be manually filtered, and this filtered solution will be injected into the GPC. The solution will pass through an in-line filter inside the GPC. The mass calculated from the DRI response represents the final mass of the polymer reaching the detector.

The highly branched polyolefin has a melting point of less than about 135° C. (preferably less than about 120° C.; preferably less than about 110° C., preferably less than about 105° C., preferably less than about 100° C., preferably less than about 95° C., preferably less than about 90° C., preferably less than about 85° C., preferably less than about 80° C., preferably less than about 75° C., preferably less than about 70° C., and preferably less than about 60° C.).

In some embodiments of this invention, the highly branched polyolefin has a heat of fusion of less than about 190° C. (preferably less than about 160° C.; preferably less than about 130° C.; preferably less than about 120° C.; preferably less than about 110° C., preferably less than about 105° C., preferably less than about 100° C., preferably less than about 95° C., preferably less than about 90° C., preferably less than about 85° C., preferably less than about 80° C., preferably less than about 75° C., preferably less than about 70° C., and preferably less than about 60° C.).

In some embodiments of this invention, the highly branched polymer has a Tc of less than 115° C. (preferably less than about 105° C., preferably less than 95° C., preferably less than 90° C., preferably less than 85° C., preferably less than 80° C., or preferably less than 75° C.).

The melting temperature Tm, crystallization temperature Tc, and heat of fusion Hf of the polymers and blends were measured using a Differential Scanning calorimeter model DSC-Q100 from TA Instruments (New Castle, Del.) equipped with 50 auto-samplers from TA Instruments. The DSC is calibrated with an indium standard weekly. Typically, 6 to 10 mg of a polymer is sealed in an aluminum pan with a hermetic lid and loaded into the instrument. In a nitrogen environment, the sample is first cooled to −90° C. at 20° C./min. It is heated to 220° C. at 10° C./min and melting data (first heat) is acquired. This provides information on the melting behavior under as-received conditions, which can be influenced by thermal history as well as sample preparation method. The sample is then equilibrated at 220° C. to erase its thermal history. Crystallization data (first cool) is acquired by cooling the sample from the melt to −90° C. at 10° C./min and equilibrated at −90° C. Finally, it is heated again to 220° C. at 10° C./min to acquire additional melting data (second heat). The exothermic crystallization transition (first cool) is analyzed for peak temperature as Tc. The endothermic melting transition (second heat) is analyzed for peak temperature as Tm and for area under the peak as heat of fusion (Hf).

The highly branched polyolefins may also have a tensile strength greater than 15 MPa, as measured by ASTM D638 at 23° C. (preferably greater than 20 MPa, preferably greater than 30 MPa).

The highly branched polyolefins may also have an elongation at break greater than 10%, as measured by ASTM D638 at 23° C., (preferably greater than 20%, preferably greater than 50%, preferably greater than 100%, preferably greater than 150%, preferably greater than 200%, preferably greater than 300%).

The highly branched polyolefins may also have a tensile strength at 100% elongation greater than 8 MPa (as measured by ASTM D638 at 23° C.), preferably greater than 10 MPa, preferably greater than 12 MPa.

In some embodiments, the highly branched polyolefins may have a tensile strength above 8 MPa, preferably a tensile strength above 10 MPa, and/or an elongation at break of at least 600%, preferably at least 700%, preferably at least 800%, and preferably at least 900%, as measured by ASTM D638 at 23° C.

The highly branched polyolefins may also show strain hardening in tensile measurements. After the yield point, the blend undergoes a period of strain hardening, in which the stress increases again with increasing strain up to the ultimate strength in a stress-strain curve as measured according to ASTM D638 at 23° C.

The highly branched polyolefins may also have a toughness (as measured by ASTM D638 at 23° C.) of 40 MJ/m3 or more, preferably 50 MJ/m3 or more, preferably 60 MJ/m3 or more. Toughness is defined as the ability of polymer to absorb applied energy up to break. The area under the stress-strain curve is used as a measure of the toughness at room temperature.

The highly branched polyolefins may have a density in a range of from 0.840 g/cm³ to 0.940 g/cm³ (preferably from 0.850 g/cm³ to 0.93 g/cm³, preferably from 0.850 g/cm³ to 0.920 g/cm³, preferably from 0.860 g/cm³ to 0.930 g/cm³, preferably from 0.870 g/cm³ to 0.92 g/cm³, and, optionally, from less than 0.925 g/cm³, preferably less than 0.920 g/cm³, and preferably less than 0.900 g/cm³), as measured by ASTM D6111.

The highly branched polyolefins preferably have a bulk density of from 0.400 g/cm³ to 0.900 g/cm³ (preferably from 0.420 g/cm³ to 0.800 g/cm³, preferably from 0.430 g/cm³ to 0.500 g/cm³, and preferably from 0.440 g/cm³ to 0.60 g/cm³), wherein a desirable range can comprise any upper bulk density limit with any lower bulk density limit described herein, as measured by ASTM D6111.

Processes to Produce Highly Branched Polyolefins

This invention also relates to processes to produce a highly branched polyolefin comprising:

(i) contacting:

(a) from about 96 wt % to about 100 wt % of a polyolefin (preferably from about 96.5 wt % to about 99.5 wt %, preferably from about 97 wt % to about 99 wt %, preferably from about 97.5 wt % to about 98.5 wt %), preferably having >0.98 g' vis, based on the total weight of polymers and multifunctional monomers;

(b) from 0 wt % to about 4 wt % (preferably from about 0.5 wt % to about 3.5 wt %, preferably about 0.5 wt % to about 3 wt %, preferably about 1 wt % to about 2.5 wt %, preferably about 1.5 wt % to about 2 wt %) of a multifunctional monomer, based on the total weight of polymers and multifunctional monomers;

(c) at least 0.1 wt % of a free radical generator (preferably from about 0.1 wt % to about 3.9 wt %, preferably from about 0.5 wt % to about 3.5 wt %, preferably from about 0.5 wt % to about 3 wt %, preferably from about 1 wt % to about 2.5 wt %, preferably from about 1.5 wt % to about 2 wt %), based on the total weight of polymers and multifunctional monomers;

(d) an optional modifying polymer (preferably 1 wt % or greater, preferably 5 wt % or greater, preferably 10 wt % or greater, preferably 15 wt % or greater, preferably 20 wt % or greater, preferably 30 wt % or greater, or preferably 40 wt % or greater, based on the total weight of polymers and multifunctional monomers); and (ii) obtaining a highly branched polyolefin;

wherein the highly branched polyolefin has: (i) a branching index, g'(vis), of less than about 0.9; (ii) a phase angle, δ, of less than about 55 degrees at a complex modulus of 10 kPa, measured at 190° C.; (iii) a gel content of less than or equal to about 10%; and (iv) a melting point of less than about 135° C.

The process may comprise adding an optional modifying polymer. In some embodiments of this invention, the optional modifying polymer is similar to the first polyolefin; alternately, the optional modifying polymer is dissimilar to the first polyolefin.

Each of the polyolefin, the optional modifying polymer, the multifunctional monomer, and the free radical generator is discussed below.

Polyolefin

The process preferably comprises contacting from about 96 wt % to 100 wt % (preferably from about 96.5 wt % to about 99.5 wt %, preferably from about 97 wt % to about 99 wt %, preferably from about 97.5 wt % to about 98.5 wt %) of a polyolefin, based on the total weight of polymers and multifunctional monomers, with at least 0.1 wt % of a free radical generator, preferably a peroxide. Preferably, 96 wt % to 100 wt % (preferably from about 96.5 wt % to about 100 wt %, preferably from about 97 wt % to about 100 wt %, preferably from about 97.5 wt % to about 100 wt %) of the polyolefin is used. The polyolefin is preferably linear, having a g'(vis) of greater than 0.98, preferably 0.99 or more, preferably 1.0 (1.0 being the theoretical upper limit of g'(vis)). The polyolefin preferably includes linear polyethylene(s). The terms "polyethylene," "ethylene-containing polymer," and "polymer comprising ethylene derived units" are used interchangeably. The polyethylene can be a linear ethylene-containing polymer having a density of 0.910 g/cm³ or more and include high density polyethylene (HDPE) and linear low density polyethylene (LLDPE) produced either with conventional Ziegler-Natta catalysts or with metallocene catalysts. In a preferred embodiment, the linear polyethylene is a polymer having a density of 0.910 g/cm³ or more; an Mw of 50,000 g/mol or more (preferably 75,000 g/mol or more, preferably 100,000 g/mol or more); a g'(vis) of 0.9 (preferably 0.99 or more, preferably 1.0); an Mw/Mn of greater than 1 to 10 (preferably from 1.5 to 8, preferably from 2 to 5); and comprises from 50 mol % to 100 mol % ethylene (preferably 65 mol % to 99 mol %, preferably 80 mol % to 97 mol %, preferably 90 mol % to 97 mol %); and from 0 mol % to 50 mol % (preferably from 1 mol % to 35 mol %, preferably 3 mol % to 20 mol %, preferably 3 mol % to 10 mol %) of C3 to C40 comonomer (preferably C3 to C40 alpha-olefin, preferably a C5 to C40 alpha-olefin, preferably propylene, butene, pentene, hexene, or octene). Particularly useful linear polyethylenes are those described in U.S. Pat. No. 6,255,426.

The polyolefin can also be a metallocene polyethylene (mPE) and/or metallocene linear low density polyethylene (mLLDPE). A "metallocene polyethylene" or an "mPE" is an ethylene polymer having a CDBI of greater than 50%, preferably greater than 60%. An "mLLDPE" is an ethylene polymer (preferably a copolymer) having a CDBI of greater than 50% (preferably greater than 60%) and a density of 0.910 to 0.940 g/cm³. The mPE homopolymers or mPE copolymers (such as mLLDPE) can be produced using mono- or bis-cyclopentadienyl transition metal catalysts or other metallocene catalysts in combination with an activator of alumoxane and/or a non-coordinating anion in solution, slurry, high pressure, or gas phase. The catalyst and activator can be supported or unsupported and the cyclopentadienyl rings can be substituted or unsubstituted. The mPE polymers, particularly mLLDPE copolymers, can include those containing a small amount of long chain branching (LCB), for example, below 5 wt %. Several commercial products produced with such catalyst/activator combinations are commercially available from ExxonMobil Chemical Company in Baytown, Tex. under the tradenames EXCEED™ and ENABLE™.

Preferred mLLDPEs are copolymers comprising at least 50 wt % ethylene and having up to 50 wt %, preferably 1 wt % to 35 wt %, even more preferably 1 wt % to 6 wt % of a C3 to C20 comonomer (e.g., C4, C6, C8), based upon the weight of the copolymer. The polyethylene copolymers preferably have an Mw/Mn of from 1 to 10, preferably from 1.5 to 8, preferably from 2 to 7, preferably from 2 to 5. The polyethylene copolymers preferably have a composition distribution breadth index (CDBI) of 60% to 85%, preferably 65% to 85%. In another preferred embodiment, the ethylene copolymer has a density of 0.910 to 0.935 g/cm³ and a CDBI of 60% to 85% or more, preferably between 65% and 85%. Composition Distribution Breadth Index (CDBI) is a measure of the composition distribution of monomer within the polymer chains and is measured by the procedure described in PCT publication WO 93/03093, published Feb. 18, 1993, including that fractions having a weight average molecular weight (Mw) below 15,000 g/mol are ignored when determining CDBI. For purposes of this invention, a homopolymer is defined to have a CDBI of 100%.

The polyolefin may also be an ethylene alpha-olefin polymer. Suitable ethylene alpha-olefins are metallocene-catalyzed polymers of ethylene and an alpha-olefin comonomer. The alpha-olefin can have 5 to 20 carbon atoms, more preferably 5 to 10 carbon atoms, and most preferably 5 to 8 carbon atoms. The ethylene alpha-olefin polymer can be obtained by a continuous gas phase polymerization using supported catalyst of an activated molecularly discrete catalyst in the substantial absence of an aluminum alkyl based scavenger (e.g., triethylaluminum (TEAL), trimethylaluminum (TMAL), tri-isobutylaluminum (TIBAL), tri-n-hexylaluminum (TNHAL), and the like). The ethylene alpha-olefin polymer has a melt index, MI, (ASTM D1238, 190° C./2.16 kg) of from 0.1 to 15 (preferably 0.3 to 10); a CDBI of at least 70% (preferably at least 75%), a density of from 0.910 to 0.930 g/cm$^3$ (preferably from 0.915 to 0.927 g/cm$^3$); a haze value (ASTM D1003) of less than 20; a melt index ratio (MIR, ASTM D1238 I21/I2) of from 35 to 80; an averaged modulus (M) of from 20,000 to 60,000 psi (137.9 to 413.7 MPa); and a relation between M and the dart impact strength, DIS, (determined by ASTM D1709, 26 inch) in g/mil complying with the formula:

$$DIS \geq 0.8[100+\exp(11.71-0.000268M+2.183\times 10^{-9}M^2)]$$

where M is the averaged modulus, as further described in U.S. Pat. No. 6,255,426, the contents of which are incorporated in their entirety, including columns 7, line 5 through column 10, line 63. The averaged modulus (M) is the sum of the 1% secant modulus (ASTM D882) in the machine direction and the transverse direction divided by two. In a preferred embodiment, the DIS is from 120 to 1000 g/mil, preferably 150 to 800 g/mil. In a preferred embodiment, the $M_w/M_n$ is from 2.5 to 5.5.

Examples of suitable ethylene alpha-olefins include several of the polymers sold under the trademark EXACT™ and available from the ExxonMobil Chemical Co., Houston, Tex., as well as the ENGAGE™ polymers available from DuPont/Dow. Particular EXACT™ polymers include EXACT™ 0201, EXACT™ 021HS, EXACT™ 0203, EXACT™ 8201, EXACT™ 8203, EXACT™ 210, and EXACT™ 8210. Typical ethylene alpha-olefins will have a density within the range having a lower limit of 0.86, or 0.87, or 0.88 g/cm$^3$ and an upper limit of 0.91, or 0.92, or 0.94 g/cm$^3$; and a melt index 12 of from a lower limit of 0.1, or 0.5, or 1.0 dg/min to an upper limit of 10, or 50, or 100 dg/min, consistent with the Melt Index Ratios described above.

The polyolefin may also be one or more thermoplastic resins. Exemplary thermoplastic resins include crystalline polyolefins, such as polypropylene and impact copolymers. Suitable thermoplastic resins can also include copolymers of polyolefins with styrene, such as a styrene/ethylene copolymer. In one or more embodiments, the thermoplastic resins are formed by polymerizing ethylene or alpha-olefins, such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another alpha-olefin, such as 1-butene, 1-hexene, 1-octene, 2-methyl-1-propene, 3-methyl-1-pentene, 4-methyl-1-pentene, 5-methyl-1-hexene, or mixtures thereof, are also contemplated. Specifically included are the homopolypropylene, impact, and random copolymers of propylene with ethylene or the higher alpha-olefins. Preferably, the homopolypropylene has a melting point of at least 130° C., for example at least 140° C. and preferably less than or equal to 160° C.; a heat of fusion of at least 75 J/g, alternatively at least 80 J/g, as determined by DSC analysis; and weight average molecular weight (Mw) of at least 50,000, alternatively at least 100,000 g/mol. Comonomer contents for these propylene copolymers will typically be from 1% to about 30% by weight of the polymer (see, for example, U.S. Pat. Nos. 6,268,438; 6,288,171; and 6,245,856). Copolymers available under the trade name VISTAMAXX™ (ExxonMobil, Houston, Tex.) are specifically included. Blends or mixtures of two or more polyolefin thermoplastics such as described herein, or with other polymeric modifiers, are also suitable.

The above described homopolymers and copolymers can be synthesized by using an appropriate polymerization technique known in the art, such as, but not limited to, the conventional Ziegler-Natta type polymerizations and catalysis employing single-site organometallic catalysts including, but not limited to, metallocene catalysts.

Modifying Polymer

The optional modifying polymer may be a similar type of polymer as the polyolefin, or dissimilar. For ease of distinction, by "dissimilar" it is meant that the polymers are chemically incompatible so as to be wholly or at least partially immiscible when physically blended together. The dissimilar polymers may include an ethylene polymer or a copolymer with a propylene polymer or copolymer; an ethylene polymer or copolymer with a styrenic polymer or copolymer; a propylene polymer or copolymer with a styrenic polymer or copolymer. Specific examples include LDPE and PP; LDPE and polystyrene; LLDPE and PP; LLDPE and polystyrene; HDPE and PP; HDPE and polystyrene; and VISTAMAXX™ copolymer and polystyrene.

Accordingly, the modifying polymer may be any of those listed above for the polyolefin starting material. Additionally, the modifying polymer may also be an elastomer. In one embodiment, the elastomer is a polymer of ethylene; an alpha olefin, such as propylene; and at least one non-conjugated diene. For example, the elastomer can be a polymer of ethylene, propylene, and ethylidene norbornene or vinyl norbornene. The elastomer can also be a polymer of ethylene, propylene, vinyl norbornene, and ethylidene norbornene. Non-conjugated dienes useful as co-monomers include straight or branched chain hydrocarbon di-olefins or cycloalkenyl-substituted alkenes, having about 6 to about 15 carbon atoms, for example, (a) straight chain acyclic dienes, such as 1,4-hexadiene and 1,6-octadiene; (b) branched chain acyclic dienes, such as 5-methyl-1,4-hexadiene, 3,7-dimethyl-1,6-octadiene, and 3,7-dimethyl-1,7-octadiene; (c) single ring alicyclic dienes, such as 1,4-cyclohexadiene, 1,5-cyclo-octadiene, and 1,7-cyclododecadiene; (d) multi-ring alicyclic fused and bridged ring dienes, such as tetrahydroindene, norbornadiene, methyl-tetrahydroindene, dicyclopentadiene (DCPD), bicyclo-(2.2.1)-hepta-2,5-diene, alkenyl, alkylidene, cycloalkenyl, and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Preferred non-conjugated dienes are 5-ethylidene-2-norbornene (ENB), 1,4-hexadiene, dicyclopentadiene (DCPD), norbornadiene, and 5-vinyl-2-norbornene (VNB), with VNB being most preferred. The terms "non-conjugated diene" and "diene" are used interchangeably herein.

In preferred embodiments of this invention, the polyolefin may be considered the major component and the modifying polymer the minor component of the highly branched composition. "Component" is used to indicate that the polyolefin or modifying polymer macromonomers are present in the highly branched polyolefin in the polymerized form. The polyolefin component may be present in amounts of 100 wt % or less (preferably 98 wt % or less, preferably 96 wt % or less, preferably 95 wt % or less, preferably 90 wt % or less, preferably 85 wt % or less, preferably 80 wt % or less, preferably 75 wt % or less, or preferably 60 wt % or less), based on the total weight of polymers and multifunctional monomers. Accordingly, the optional modifying polymer component may be present in an amount of 0 wt % or greater, 1 wt % or greater, 5 wt % or greater, 10 wt % or greater, 15 wt % or greater, 20 wt % or greater, 30 wt % or greater, or 40 wt % or greater. Where more than two starting material polymers are used, the total wt % for the polymers (including both the polyolefin and the optional modifying polymer) and multifunctional monomer units is 100 wt %.

Some examples of highly branched compositions include LDPE as the polyolefin component and any of HDPE, VISTAMAXX™ copolymer, EXACT™ plastomer, ethylene/propylene rubber (EPR), ethylene/propylene/diene rubber (EPDM), polystyrene (PS), styrene/ethylene/butene-1/styrene block copolymer (SEBS), poly(phenylene oxide) (PPO), and the like as the modifying polymer component. The polyolefin component may also be HDPE and the modifying polymer component may be any of LDPE, VISTAMAXX™ copolymer, an EXACT plastomer, EPR, EPDM, SEBS, PPO, and so on. Yet further, the polyolefin component may also be VISTAMAXX™ copolymer and the modifying polymer component may be HDPE, an EXACT™ plastomer, EPR, EPDM, SEBS, PP, PS, PPO, and the like. In other embodiments of this invention, the polyolefin may be an EXACT™ plastomer and the modifying polymer may be an EPR, EPDM, PP, PS, LDPE, HDPE, SEBS, or PPO. Other combinations of dissimilar polymers are envisioned so long as the major and minor components are chemically incompatible as described above.

Multifunctional Monomers

"Multifunctional monomers," as used herein, means a molecule having two or more functional groups, which may be the same or different, capable of being polymerized. For example, 3,9-divinyl-2,4,8,10-tetraoxaspiro[5,5]undecane is a multifunctional monomer for the purposes of this invention because it has two vinyl groups capable of being polymerized, as represented in the structure below:

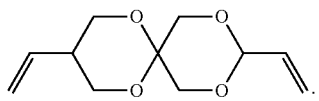

Another example is trially 1,3,5-benzenetricarboxylate, which is multifunctional, because it has three allyl groups capable of being polymerized.

Functional groups capable of being polymerized include unsaturated groups such as vinyls, vinylidenes, vinylenes, acrylates, allylic groups, and the like.

The process for producing highly branched compositions comprises contacting from about from 0 wt % to 4 wt % (preferably from about 0.5 wt % to about 3.5 wt %, preferably from about 0.5 wt % to about 3 wt %, preferably from about 1 wt % to about 2.5 wt %, preferably from about 1.5 wt % to about 2 wt %) of at least one multifunctional monomer, based on the total weight of polymers and multifunctional monomers, with at least one polyolefin and at least one free radical generator.

Suitable multifunctional monomers include one or more vinyl compounds, allylic compounds, acrylate compounds, or combinations thereof.

Suitable vinyl compounds include 3,9-divinyl-2,4,8,10-tetraoxaspiro[5,5]undecane (DVTU), 2,5-norbornadiene, divinylphenylphosphine, divinyl sulfone, divinyl sulfoxide, 1-3-divinyltetramethyldisiloxane, 1,2 polybutadiene, divinyl benzene, and combinations thereof.

Suitable allylic compounds include triallyl trimesate, triallyl trimellitate, diallyl terephthalate, diallyl isophthalate, diallyl phthalate, triallylcyanurate, triallylisocyanurate, triallylamine, triallyl 1,3,5-benzenetricarboxylate, triallylphosphine, triallyl phosphate, 1,3,5-triallyl-1,3,5-triazine-2,4,6 (1H,3H,5H)-trione, and combinations thereof.

Suitable acrylate compounds include triallyl 1,3,5-benzenetricarboxylate, trimethylolpropane trimethacrylate, trimethylolpropane triacrylate, trimethylolpropane propoxylate triacrylate, polyethylene glycol dimethacrylate, ethylene glycol dimethacrylate, triethylene glycol diacrylate, pentaerythritol triacrylate, pentaerythritol tetraacrylate, pentaerythritol tetramethacrylate, 1,4-butanediol diacrylate, 1,6-hexanediol diacrylate, and combinations thereof.

Useful multifunctional monomers may be either solids or liquids at ambient temperature. Suitable solid multifunctional monomers have a melting point above room temperature, such as, a melting point of at least 25° C., preferably 28° C. or more, preferably 29° C. or more, preferably 30° C. or more, preferably 31° C. or more, or preferably 32° C. or more. The melting point may range from a low of about 25° C., 29° C., or 33° C. to a high of about 37° C., 43° C., 50° C., 60° C., 70° C., 80° C. or 100° C. Room temperature is defined to be 23° C. unless otherwise indicated.

Free Radical Generators

The process for producing highly branched compositions comprises contacting at least 0.1 wt % of a free radical generator (preferably from about 0.1 wt % to about 3.9 wt %, preferably from about 0.5 wt % to about 3.5 wt %, preferably about 0.5 wt % to about 3 wt %, preferably about 1 wt % to about 2.5 wt %, preferably about 1.5 wt % to about 2 wt %), based on the total weight of polymers and multifunctional monomers; with the first polymer and optionally the multifunctional monomers, and yet further optionally a modifying polymer.

In this invention, useful free radical generators include organic peroxides such as diaryl peroxides, ketone peroxides, peroxydicarbonates, peroxyesters, dialkyl peroxides, hydroperoxides, benzoyl peroxides, lauroyl peroxides, di-t-butyl peroxide, dicumyl peroxide, t-butylcumyl peroxide, t-butyl peroctoate, p-di(t-butylperoxy)diisopropylbenzene, 2,5-dimethyl-2,5-di(t-butylperoxy)hexane, 1,1-di(t-butylperoxy)-3,3,5-trimethylcyclohexane, 2,5-dimethyl-2,5-di(t-butylperoxy)hexene-3, t-butyl-peroxy-(cis-3-carboxy)propenoate, 1,1-di(t-amylperoxy)cyclohexane, t-amyl-(2-ethylhexyl) peroxycarbonate, t-butylperoxy-3,5,5-trimethylhexanoate, t-butyl peroxybenzoate, and mixtures thereof.

In particular, the organic peroxide may be one or more of benzoyl peroxide, methyl ethyl ketone peroxide, tert-butyl peroxy benzoate, tert-butyl perbenzoate, tert-butylperoxy acetate, tert-butyl (2-ethylhexyl)monoperoxy carbonate, n-butyl-4,4-di-(tert-butyl peroxy) valerate, 1,1-bis(tert-butylperoxy)cyclohexane, 1,1-bis(tert-butylperoxy)-3,3,5-trimethylcyclohexane, 2,2-bis(tert-butylperoxy)butane, tert-butylcumylperoxide, bis-(tert-butylperoxy isopropyl) benzene, di-tert-butylperoxide, 2,5-dimethyl-2,5-di(tert-butylperoxy)hexane, cyclohexanone peroxide, t-butylperoxyisopropyl carbonate, di-ti-butyl terphthalate, 2,5-dimethyl-2,5-di(t-butylperoxy)hexene, 2,5-dimethyl-2,5-di(t-butylperoxy)hexyne-3, di-(tert-amyl) peroxide, bis(alpha-methylbenzyl) peroxide, benzoyl peroxide, 3,6,9-triethyl-3,6,9-trimethyl-1,4,7-triperoxonane, bis(tert-butylperoxy)-diisopropylbenzene, di-tert-butyl peroxide, cumene hydroperoxide, tert-butyl hydroperoxide, hydroperoxides, dilauryl peroxide, dicumyl peroxide, derivatives thereof, or combinations thereof.

Peroxides having a 1 minute half-life at temperatures of less than 200° C. (preferably less than 185° C., preferably less than 170° C.) are preferred. Blends of peroxides having different activation temperatures can be utilized to more precisely control the process. Peroxides useful herein are available from a variety of commercial suppliers, including LUPEROX™ from Arkema (France), TRIGONOX™ and PERKADOX™ from Akzo Nobel (Netherlands), and VAROX™ from R. T. Vanderbilt (Norwalk, Conn.), either as a liquid product, a solid product, or as a concentrated assay on an inorganic support.

Although organic peroxides are discussed above, any free radical generator capable of generating a free radical in polyolefins is considered within the scope of this application.

The polyolefin, optional multifunctional monomers, and free radical generator may be combined in any order. These reactants can be in solid or liquid form. Typically, the polyolefin is in a solid form. Free radical generators may be selected to be solids. If all the process components are solids, the free radical generator may be tumble mixed with the polymers (including the polyolefin and the optional modifying polymer(s)) before being introduced into a reaction zone.

The reactants are typically combined or contacted with each other in a reaction zone, such as a BRABENDER™ mixer, an extruder, mill equipment, a reaction vessel, or a stirred tank reactor. Preferably, the process is carried out without the use of a solvent (if solvent is used, preferably the solvent is less than 1 wt %, based on the total weight of polymers and multifunctional monomers). Preferably, the process of this invention occurs in the melt phase. Preferably, the process of this invention occurs in a mixer such as a BRABENDER™ mixer or an extruder. Preferably, the process occurs at a temperature in the range of from about 60° C. to about 300° C. and more preferably from about 100° C. to about 250° C.

The process may be batch, semi-batch, or continuous. As used herein, the term "continuous" means a system that operates without interruption or cessation. For example, a continuous process to produce a polymer would be one where the reactants are continually introduced into one or more reactors and polymer product is continually withdrawn. Accordingly, reactive blending may be accomplished using a batch mixer (BRABENDER™ mixer, two roll mill, etc.) or a continuous mixer (single screw extruder, twin screw extruder, etc.). A highly branched polyolefin is thereby obtained.

Optionally, the highly branched composition may also include one or more polymer additives, such as reinforcing and non-reinforcing fillers, scratch resistant agents, plasticizers, antioxidants, heat stabilizers, extender oils, lubricants, antiblocking agents, antistatic agents, anti-fogging agent, waxes, foaming agents, pigments, flame/fire retardants, dyes and colorants, ultraviolet absorbers, and nano-fillers. Other additives include, for example, blowing agents, processing aids, tackifying resins, and other processing aids known in the polymer compounding art. The lists described herein are not intended to be inclusive of all types of additives which can be employed with the present invention. Upon reading this disclosure, those of skilled in the art will appreciate other additives can be employed to enhance properties. As is understood by the skilled in the art, the blends of the present invention can be modified to adjust the characteristics of the blends as desired. The aforementioned additives can be either added independently or incorporated into an additive or masterbatch. Such additives can comprise up to about 70 wt %, more preferably up to about 65 wt %, of the total additive or masterbatch composition.

Also, optionally, the highly branched composition may include one or more slip agents or mold-release agents to facilitate moldability, preferably present at 50 ppm to 10 wt %, more preferably 50 ppm to 5000 ppm, even more preferably 0.01 wt % to 0.5 wt % (100 ppm to 5000 ppm), even more preferably 0.1 wt % to 0.3 wt % (1000 ppm to 3000 ppm), based upon the weight of the composition. Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones, and cured silicones); sodium alkylsulfates, alkyl phosphoric acid esters; stearates (such as zinc stearate); and mixtures thereof. Preferred slip additives are unsaturated fatty acid amides, which are available from Crompton (Kekamide™ grades) and Croda Universal (Crodamide™ grades). Particularly preferred are the erucamide and oleamide versions of unsaturated fatty acid amides. Preferred slip agents also include amides having the chemical structure CH3(CH2)7CH=CH(CH2)xCONH2 where x is 5 to 15. Particularly preferred amides include: 1) Erucamide CH3(CH2)7CH=CH(CH2)11CONH2 which can also be referred to as cis-13-docosenoamide (Erucamide is commercially available from Akzo Nobel Amides Co. Ltd. under the trade name ARMOSLIP E); 2) Oleylamide CH3(CH2)7CH=CH(CH2)8CONH2; and 3) Oleamide which can also be referred to as N-9-octadecenyl-hexadecanamide CH3(CH2)7CH=CH(CH2)7CONH2. In another embodiment, stearamide is also useful in this invention. Other preferred slip additives include those described in WO 2004/005601A1.

The highly branched polymer may be used by itself as a polymer (neat) or it may be blended as a modifier into a selected base polymer to form a homogenous blend. These homogenous blends and processes to produce them are discussed below.

Homogeneous Blends

Homogeneous blends, as used herein, means free from visible gels. Preferably, the homogeneous blends of this invention have less than 1 wt % of insoluble material, when the blend is dissolved in boiling xylenes. Blends, as used herein, means physical blends, in direct contrast to the reactive blending described in the process above to produce the highly branched polymer.

This invention also relates to homogeneous blends, comprising:

(i) from about 1 wt % to about 90 wt % (preferably from about 1 wt % to about 70 wt %, preferably from about 1 wt % to about 50 wt %, preferably from about 1 wt % to about 10 wt %, or preferably from about 1 wt % to about 5 wt %) of a highly branched polyolefin, based on the total weight of polymers in the blend;

(ii) from about 10 wt % to about 99 wt % (preferably from about 30 wt % to about 99 wt %, preferably from about 50 wt % to about 99 wt %, preferably from about 90 wt % to about 99 wt %, or preferably from about 95 wt % to about 99 wt %) of a base polymer comprising a $C_2$ to $C_{20}$ polyalphaolefin, based on the total weight of polymers in the blend; wherein the base polymer has a g'(vis) of greater than 0.91; and wherein the highly branched polyolefin has:

(i) a branching index, g'(vis), of less than about 0.9;
(ii) a phase angle, $\delta$, of less than about 55 degrees at a complex modulus of 10 kPa, measured at 190° C.;
(iii) a gel content of less than or equal to about 10%; and
(iv) a melting point of less than about 135° C.

In preferred embodiments, the base polymer is a linear polymer comprising ethylene derived units and has a density of at least 0.910 g/cm³ (preferably 0.940 g/cm³ or more), preferably a linear low density polyethylene or a high density polyethylene.

In preferred embodiments, the base polymer is a polymer having a g'(vis) of greater than 0.91 (preferably greater than 0.95 or preferably greater than 0.98).

In other embodiments, the base polymer is a polymer comprising ethylene derived units and has a CDBI of 60% or more (preferably the polymer comprising ethylene derived units has an Mw of 50,000 g/mol or more, a g'(vis) of 0.95 or more and an Mw/Mn of from 1 to 10 and comprises from 50 mol % to 100 mol % ethylene and from 0 mol % to 50 mol % of C3 to C40 comonomer). In preferred embodiments, the base polymer is a polymer of an ethylene and at least one alpha olefin having 5 to 20 carbon atoms, where the base polymer has a melt index (190° C./2.16 kg) of from 0.1 to 15 dg/min; a CDBI of at least 70%, a density of from 0.910 to 0.930 g/cm³; a haze value of less than 20; a melt index ratio of from 35 to 80; an averaged modulus (M) of from 20,000 to 60,000 psi and a relation between M and the dart impact strength in g/mil, DIS, complying with the formula:

$$DIS \geq 0.8[100 + \exp(11.71 - 0.000268M + 2.183 \times 10^{-9}M^2)].$$

This invention also relates to homogeneous blends comprising: (i) from about 10 wt % to about 99 wt % (preferably from about 30 wt % to about 99 wt %, preferably from about 50 wt % to about 99 wt %, preferably from about 90 wt % to about 99 wt % or preferably from about 95 wt % to about 99 wt %) of polyethylene; (ii) 1 wt % to 90 wt % (preferably 1 wt % to 70 wt %, 1 wt % to 50 wt %, 1 wt % to 10 wt %, or 1 wt % to 5 wt %) of a highly branched polyethylene; and (iii) from 0 wt % to about 90 wt % (preferably from about 1 wt % to about 70 wt %, preferably from about 1 wt % to about 50 wt %, preferably from about 1 wt % to about 10 wt %, or preferably from about 1 wt % to about 5 wt %) of a highly branched copolymer of polyethylene and a dissimilar polymer (preferably the dissimilar polymer is one of polypropylene, random copolymer, polystyrene, styrene/ethylene/ butene-1/styrene block copolymer, poly(phenylene oxide), ethylene-propylene copolymer, or ethylene propylene diene rubber).

Properties of the Blend

The blend composition of a base polymer and the highly branched polymer composition possess a unique combination of strong shear thinning, good melt strength (elasticity) and strong mechanical properties, such as higher elongation at break and tensile strength. In some embodiments of this invention, the polymer blend has a phase angle ($\delta$) of about 79° or less at a complex modulus of 10 kPa at 190° C.; and a degree of shear thinning of greater than or equal to 0.65 at 190° C.

In a plot of the loss or phase angle, $\delta$, versus the measurement frequency, $\omega$, polymers or blends that have long chain branches exhibit a plateau in the function of $\delta(\omega)$, whereas linear polymers do not have such a plateau. According to Garcia-Franco et al., Macromolecules, 34 (10), 3115, 2001, the plateau in the aforementioned plot will shift to lower phase angles $\delta$ when the amount of long chain branching occurring in the polymer sample increases.

The small amplitude oscillatory shear (SAOS) data can be transformed into discrete relaxation spectra using the procedure in R. B. Bird, R. C. Armstrong, and O. Hassager, Dynamics of Polymeric Liquids, Volume 1, Fluid Mechanics, 2nd Edition, John Wiley and Sons, 1987, pages 273-275. The storage and loss moduli are simultaneously least squares fit with the functions:

$$G'(\omega_j) = \Sigma \eta_k \lambda_k \omega_j^2 / (1 + (\eta_k \omega_k)^2)$$

$$G''(\omega_j) = \Sigma \eta_k \lambda_k \omega_j / (1 + (\eta_k \omega_k)^2)$$

at the relaxation times $\lambda_k = 0.01$, 0.1, 1, 10, and 100 seconds. Therefore, the sums are from k=1 to k=5. The sum of the $\eta_k$'s is equal to the zero shear viscosity, $\eta_0$. An indication of high levels of branched structure is a high value of $\eta_5$, corresponding to the relaxation time of 100 s, relative to the zero shear viscosity. The viscosity fraction of the 100 s relaxation time is $\eta_{15}$ divided by the zero shear viscosity, $\eta_0$. Chains with long relaxation times cannot relax during the cycle time of the SAOS experiment and lead to high zero shear viscosities.

Shear thinning is characterized by the decrease of complex viscosity with increasing frequency as mentioned before. One way to quantify the shear thinning is to use a ratio of the difference between the complex viscosity at a frequency of 0.1 rad/s and the complex viscosity at a frequency of 100 rad/s to the complex viscosity at a frequency of 0.1 rad/s when the complex viscosity is measured at 190° C. The larger this ratio, the higher is the degree of shear thinning. This ratio is the typical output of the SAOS experiments. A conventional SAOS test temperature is 190° C. Polymer viscosity is conveniently measured in poise (dyne-second/square centimeter) or Pa·s (1 Pa·s=10 poises) at frequencies within a range of from 0 to 100 rad/sec and at 190° C. under a nitrogen atmosphere using a dynamic mechanical spectrometer, such as the Advanced Rheometrics Expansion System (ARES). Generally, a high degree of shear thinning indicates a polymer is readily processable in high shear fabrication processes, for example, by injection molding.

Use of the Polymer Blends

The highly branched polyolefins can be used in many applications where thermoplastics are used. The inventive blends provide high melt strength, ease of processability (shear thinning), and higher application temperatures over a wide range of densities. The highly branched polyolefins are useful in such forming operations as film, sheet, pipe, and fiber extrusion and co-extrusion, as well as blow molding, injection molding, and rotary molding. Films include blown or cast films formed by coextrusion or by lamination useful as shrink film, cling film, stretch film, sealing films, oriented films, snack packaging, heavy duty bags, grocery sacks, baked and frozen food packaging, cable and wire sheathing, medical packaging, industrial liners, membranes, etc. in food-contact and non-food contact applications. Fibers include melt spinning, solution spinning, and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers, toys, etc.

The films can be of any desirable thickness or composition, in one embodiment from 1 to 100 microns, from 2 to 50 microns in a more particular embodiment, and from 10 to 30 microns in yet a more particular embodiment; and comprise copolymers of ethylene with a C3 to C10 olefin in one embodiment, ethylene with C3 to C8 α-olefins in a particular embodiment, and ethylene with C4 to C6 α-olefins in yet a more particular embodiment. The resins used to make the films can be blended with other additives such as pigments, antioxidants, fillers, etc., as is known in the art, as long as they do not interfere with the desired film properties.

The highly branched polyolefins can also be used as an impact modifier of polypropylene. TPO (thermoplastic olefin) compounding is the process of mixing polypropylene (PP) with other ingredients to form a PP based multi-component mixture. For typical TPO applications, the TPO mixture can contain about 10% to 30% by weight of the highly branched polymer compositions.

The highly branched polyolefins, especially those using VISTAMAXX™ copolymer, polypropylene, RCP, EPR, EPDM, and the like as the polyolefin or modifying polymer, can be used in any known application involving molding or extrusion, including consumer goods, industrial goods, construction materials, packaging materials, and automotive parts. The highly branched polymer composition or a similar copolymer composition described herein can be molded into desirable end use articles by any suitable means known in the art, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. They are particularly useful for making articles by injection molding, blow molding, film blowing, extrusion, thermoforming, gas foaming, elasto-welding, and compression molding techniques.

Preferred articles made using the highly branched polymer composition or a similar copolymer composition or its blend with a polyolefin described herein include cookware, storageware, toys, medical devices, medical containers, healthcare items, sheets, crates, containers, bottles, packaging, wire and cable jacketing, pipes, sporting equipment, chair mats, tubing, profiles, instrumentation sample holders and sample windows, automotive, boat and water craft components, and other such articles. In particular, the compositions are suitable for automotive components, such as trim parts, parts for dashboards and instrument panels, mirror housing, body panel, protective side molding, and other interior and external components associated with automobiles, trucks, boats, and other vehicles.

The disclosed molded parts can also be fabricated using a co-injection molding process, whereby an injection mold is used to form the part and/or lid and the materials are co-injected into the mold to form separate skins. Also, the part and/or lid can be fabricated using an overmolding process, whereby one of the layers is molded first and the other layers are molded over the previously molded structure. Conventional injection molding and thermal molding can also be utilized. Further, injection molding and blow molding techniques can be combined by injection molding a preform, which is transferred to a blow mold, and inflated to form an outer structure with inner structures or layers blown into the outer structure. The process can be repeated to form as many layers as desired.

In certain embodiments, the molded articles made of the highly branched polyolefins are preferably formed by thermoforming, blow molding, injection molding, compression molding, or injection-compression molding. The nature of high shear thinning of the highly branched polymer composition or its blend with a polyolefin described herein provides a number of advantages in the injection molding processes. These materials allow using multi-shot injection molding, and making thinner and bigger pieces. It is also possible to use lower injection temperature for these invented compositions. In addition to the energy saving, lower injection temperature will reduce the sample cooling time and reduce the production cycle time, and make the injection process more efficient.

EXAMPLES

Tests
Molecular Weight

In the examples that follow, weight-average molecular weight (Mw), molecular weight distribution (MWD), Mw/Mn where Mn is the number-average molecular weight, and the branching index, g'(vis), were characterized using a High Temperature Size Exclusion Chromatograph (SEC), equipped with a differential refractive index detector (DRI), an online light scattering detector (LS), and a viscometer. Experimental details not described below, including how the detectors are calibrated, are described in: T. Sun, P. Brant, R. R. Chance, and W. W. Graessley, Macromolecules, Volume 34, Number 19, 6812-6820, (2001).

Solvent for the SEC experiment was prepared by dissolving 6 g of butylated hydroxy toluene as an antioxidant in 4 L of Aldrich reagent grade 1,2,4 trichlorobenzene (TCB). The TCB mixture was then filtered through a 0.7 μm glass prefilter and subsequently through a 0.1 μm Teflon filter. The TCB was then degassed with an online degasser before entering the SEC. Polymer solutions were prepared by placing the dry polymer in a glass container, adding the desired amount of TCB, then heating the mixture at 160° C. with continuous agitation for about 2 hr. All quantities were measured gravimetrically. The TCB densities used to express the polymer concentration in mass/volume units are 1.463 g/mL at room temperature and 1.324 g/mL at 135° C. The injection concentration ranged from 1.0 to 2.0 mg/mL, with lower concentrations being used for higher molecular weight samples. Prior to running each sample, the DRI detector and the injector were purged. Flow rate in the apparatus was then increased to 0.5 mL/min, and the DRI was allowed to stabilize for 8-9 hr before injecting the first sample. The LS laser was turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm³, molecular weight is expressed in kg/mol, and intrinsic viscosity is expressed in dL/g.

The light scattering detector used was a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_o c/\Delta R(\theta,c)]=[1/MP(\theta)]+2A_2 c$$

where $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 \left(\frac{dn}{dc}\right)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers. For EPDM, the values of $A_2$ and dn/dc were determined based on the ethylene/propylene composition of the EPDM using a standard calibration procedure, such that dn/dc=0.104−0.0016DM; and $A_2$=0.0015−10⁻⁵ EP; where EP is the weight percent of propylene in the EP portion of the EPDM terpolymer and DM is the weight percent of diene (such as ENB) in the EPDM terpolymer.

The molecular weight averages were defined by considering the discontinuous nature of the distribution in which the macromolecules exist in discrete fractions i containing Ni molecules of molecular weight Mi. The weight-average molecular weight, Mw, was defined as the sum of the products of the molecular weight Mi of each fraction multiplied by its weight fraction wi:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i.$$

The number-average molecular weight, Mn, is defined as the sum of the products of the molecular weight Mi of each fraction multiplied by its mole fraction xi:

$$M_n = \Sigma x_i M_i = \Sigma N_i M_i / \Sigma N_i$$

since the mole fraction $x_i$ is defined as $N_i$ divided by the total number of molecules $$x_i = N_i / \Sigma N_i.$$

In the SEC, a high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, [η], at each point in the chromatogram was calculated from the following equation:

$$\eta_s = c[\eta] + 0.3(c[\eta])^2$$

where c was determined from the DRI output.

The branching index (g', also referred to as g'(vis)) was calculated using the output of the SEC-DRI-LS-VIS method as follows. The average intrinsic viscosity, [η]avg, of the sample is calculated by:

$$[\eta]_{avg} = \frac{\sum c_i [\eta]_i}{\sum c_i}$$

where the summations are over the chromatographic slices, i, between the integration limits.

The branching index g'(vis) is defined as:

$$g' = \frac{[\eta]_{avg}}{kM_v^\alpha}$$

where k=0.000579 and α=0.695 for ethylene polymers, k=0.0002288 and α=0.705 for propylene polymers, and k=0.00018 and α=0.7 for butene polymers. For EPDM, the values of k and α are determined based on the ethylene/propylene composition of the EPDM using a standard calibration procedure such that: k=(1−0.012254DM)(1−0.0048601EP−6.8989×10⁻⁶EP²)×5.9×10⁻⁴ (200000)⁻$^{Trunc(0.1EP)/1000}$ and α=0.695+Trunc(0.1EP)/1000, where EP is the weight percent of propylene in the EP portion of EPDM rubber, DM is the weight percent diene in the EDPM rubber, and Trunc indicates that only the integer portion is kept in the calculation. For example, Trunc(5.3)=5.

Mv is the viscosity-average molecular weight based on molecular weights determined by the LS analysis:

$$M_v = (\Sigma c_i M_i^\alpha / \Sigma c_i)^{1/\alpha}.$$

Percent gel of the analyzed polymer is determined from the inject mass and the mass calculated from the DRI response, as follows: % gel=[(inject mass)−(mass calculated from the DRI response)]/(inject mass). The inject mass is the original mass of the polymer used to prepare the TCB polymer solution. Then the TCB polymer solution will be manually filtered, and this filtered solution will be injected into the GPC. The solution will pass through an in-line filter inside the GPC. The mass calculated from the DRI response represents the final mass of the polymer reaching the detector.

Phase Angle and Shear Thinning

Phase angle and degree of shear thinning are determined by Small Amplitude Oscillatory Shear (SAOS). Polymers and the BRABENDER™ mixes were compression-molded into plaques with a thickness of about 2 mm. A press at 180° C., a molding time of 15 min, and a press force of 25 tons (22.6 Mg) were used.

In the stress-strain experiments, the molded plaque with a thickness of about 2 mm was die-cut into micro-dumbbell specimens (the base was ~1 cm×1 cm and the center, narrow strip was ~0.6 cm×0.2 cm). Stress-strain measurements under tension were then performed in an INSTRON™ tester (available from Instron, Norwood Mass.). Measurements (using triplicate samples, conditioned under ambient conditions for 24 hours prior to tests) were performed at room temperature (25° C.) and at a separation speed of 2"/min=850 μm/s until each dumbbell sample was broken. The stress was calculated based on the undeformed cross-sectional area of the test specimen. Strain measurements were based on clamp separation. From these stress-strain data points, the whole stress-strain curve was constructed. Tensile parameters, such as the Young's modulus (Eo; obtained from the initial slope of the stress-strain curve), the yield strain (ey), the yield stress (σy), the modulus at 100% strain (E100), the strain at break (eb), the tensile strength (σb), and the tensile toughness (U, calculated as the total area under the stress-strain curve) were then determined Some of the PE and blend materials described in this invention showed two yield points. According to N. W. Brooks, et al., J. Macromol. Sci., B 34, 29, 1995, the first yield point corresponds to reorientation/rotation of the lamellae within the spherulites in PE. The reoriented lamellae are oriented at about 45° to the draw direction. The second yield point corresponds to the destruction of the lamellae laying 45° to the draw direction. The subsequent permanent deformation corresponds to crystallographic slip processes corresponding to the breakup of lamellar structures for the lamellae oriented perpendicular to the draw direction, and chain pull-out (along lamellar axes) for those lamellae oriented parallel to the draw direction. Both processes lead to extended chain crystals. The original lamellae are destroyed and then re-crystallize into extended chain crystals, which appear as additional transitions in the stress-strain curve. The values of ey and σy shown in the various tables of this invention were based on the first yield point starting from the lower-strain region of the stress-strain curve.

In the DMTA experiment, a sample with a dimension of ~23 mm×6.42 mm was die-cut from the compression-molded plaque with a thickness of about 0.7 mm. It was conditioned under ambient conditions for 24 hours before the measurement. The instrument used was the DMTA V (available from TA Instruments, New Castle, Del.) in tension mode (0.05% strain, 1 Hz frequency, 2° C./min heating rate, and a temperature range of ca. −100° C. to 150° C.). For polyethylene, the α and β relaxation temperatures were determined from the positions of the loss tangent maximum.

Relaxation temperature, phase angle and degree of shear thinning are determined by small-strain dynamic mechanical measurements. Polymers and the BRABENDER™ mixes are compression-molded into plaques with a thickness of about 0.7 mm and a thickness of about 2 mm. A press at 180° C., a molding time of 15 min, and a press force of 25 tons (22.6 Mg) are used.

In the Dynamic Mechanical Thermal Analysis (DMTA) experiment, a sample with dimensions of ~23 mm×6.42 mm is die-cut from the compression-molded plaque with a thickness of about 0.7 mm. The sample is conditioned under ambient conditions for 24 hours before the measurement. The instrument used is the DMTA V (available from TA Instruments, New Castle, Del.) in tension mode (0.05% strain, 1 Hz frequency, 2° C./min heating rate, and a temperature range of ca. −100° C. to 150° C.). For each EPDM, the relaxation temperatures are determined from the positions of the loss modulus and loss tangent maxima.

For the determinations of phase angle and degree of shear thinning of polymers and blends via SAOS, a circular sample with a diameter of 25 mm was die-cut from the compression-molded plaque with a thickness of about 2 mm. The sample was mounted between the 25-mm diameter parallel plates in a Rheometric Scientific ARES Analyzer (Piscataway, N.J.). The test temperature was 190° C. and the strain applied was 10%. The complex modulus (G*), the phase angle (δ), and the complex viscosity (η*) were measured as the frequency is varied from 0.01 to 100 rad/s.

The phase or loss angle δ, is the inverse tangent of the ratio of G" (the shear loss modulus) to G' (the shear storage modulus). For a typical linear polymer, the phase angle at low frequencies (or long times) approaches 90° because the chains can relax in the melt, adsorbing energy and making G" much larger than G'. As frequencies increase, more of the chains relax too slowly to absorb energy during the shear oscillations, and G' grows relative to G". Eventually, G' and G" become equal and the phase angle reaches 45°. In contrast, a branched chain polymer relaxes very slowly even at temperatures well above the melting temperature of the polymer, because the branches need to retract before the chain backbone can relax along its tube in the melt. This polymer never reaches a state where all its chains can relax during a shear oscillation, and the phase angle never reaches 90° even at the lowest frequency, ω, of the experiments. The phase angle is also relatively independent of the frequency of the oscillations in the small-strain rheology experiment; another indication that the chains cannot relax on these timescales. These slowly relaxing chains lead to a higher zero shear viscosity. Long relaxation times lead to a higher polymer melt strength or elasticity.

Shear thinning is a unique rheological behavior of polymer melts during flow, where the resistance of a polymer melt to flow (steady-state viscosity) along a cylindrical tube decreases with increasing flow or shear rate. More specifically, the viscosity is generally constant at low shear rates. This is the Newtonian region and the viscosity there is called the zero shear viscosity. It is commonly more difficult to reach the Newtonian region in very polydisperse commercial polymers. At high shear rates, the viscosity drops inversely with a power of the shear rate. This is called the power law region. The crossover from the Newtonian behavior to the power law behavior is characterized by a critical shear rate, usually defined for convenience as the shear rate at which the viscosity has decreased to 20% below the zero shear viscosity. Shear thinning is believed to result from the stretching of the "entangled" state to an "oriented" state of the polymer chains when the applied shear rate is higher than this critical shear rate. Simply put, the polymer chains are increasingly stretched out in the shear direction as the shear rate or strain rate increases. This produces a decrease in the number of entanglements relative to the unstrained state, and consequently, a decrease in melt viscosity. According to W. W. Graessley (Adv. Polym. Sci., 16, 1, 1974), the product of this critical shear rate and the characteristic relaxation time of the polymer is a constant. The longer relaxation time for a branched polymer makes the critical shear rate smaller than would be for a linear polymer with the same viscosity. Hence, the viscosity of a branched polymer is lower at high shear rates and the curves of viscosity plotted against shear rate for linear and branched polymers can cross. As a result, a polymer containing long chain branching exhibits a higher degree of shear thinning than a linear polymer in the molten state.

The real or in-phase component of the complex dynamic viscosity, η', at low frequencies approaches the steady flow zero shear viscosity. However, According to J. D. Ferry, Viscoelastic Properties of Polymers, 3rd Ed., Wiley, New York, 1980, η' and the steady flow viscosity should not be similar at large values of frequency and shear rate, respectively. This is due to the fact that steady flow at a high shear rate involves different molecular motions from oscillatory flow at low strains where escape from topological restrains is not required. However, it has been confirmed experimentally that the complex dynamic viscosity closely resembles the steady flow viscosity for homopolymers and polymer solutions (W. P. Cox and E. H. Merz, J. Polym. Sci., 28, 619, 1958; S. Onogi, T. Fuji, H. Kato, and S. Ogihara, J. Phys. Chem., 68(6), 1598, 1964; S. Onogi, H. Kato, S. Ueki, and T. Ibaraji, J. Polym. Sci., C15, 481, 1966; E. K. Harris, Jr., Ph.D. Thesis, University of Wisconsin, 1970). Therefore, the complex dynamic viscosity is employed throughout this invention to study the melt processability of the polymer systems and shear thinning is characterized by the decrease of complex dynamic viscosity with increasing frequency. Again, the complex viscosity can be measured by the small-strain rheological testing of the molten polymer (for example, at 190° C.) performed in a dynamic (oscillatory) rheometer in the shear mode as described in previous paragraphs. One way to quantify the degree of shear thinning is to use a ratio of the difference between the complex viscosity at a frequency of 0.1 rad/s:

[η*(0.1 rds)−η*(100 rds)]/η*(0.1 rds)

where η*(0.1 rds) and η*(100 rds) are the complex viscosities at frequencies of 0.1 and 100 rds, respectively, measured at 190° C. This ratio is used to measure the degree of shear thinning of the polymeric materials discussed in the various tables of this invention. The larger this ratio, the higher is the degree of shear thinning Polymers exhibiting shear thinning behaviors are easily processed in high shear rate fabrication methods, such as injection molding.

The complex modulus (G*) is equal to $[(G')^2+(G'')^2]^{1/2}$. The plot of phase angle versus the complex modulus is known as the van Gurp-Palmen plot (See M. van Gurp, J. Palmen, Rheol. Bull., 67, 5-8, 1998). The values of δ listed in the various tables of this invention are those at a G* of 10 kPa. The lower this δ, the higher is the melt elasticity or melt strength.

Melt Index

Melt index (MI) expressed in dg/min was measured according to ASTM D 1238 at 190° C. A load of 2.16 kg was used.

Melting Temperature, Crystallization Temperature and Heat of Fusion

The crystallization temperature Tc and melting temperature Tm of the polymers and blends were measured using a DSC Q100 equipped with 50 auto-samplers from TA Instruments. This DSC was calibrated with an indium standard weekly. Typically, 6 to 10 mg of a polymer was sealed in an aluminum pan with a hermetic lid and loaded into the instrument. In a nitrogen environment, the sample was first cooled to −90° C. at 20° C./min. It was heated to 220° C. at 10° C./min and melting data (first heat) were acquired. This provides information on the melting behavior under as-received conditions, which can be influenced by thermal history as well as sample preparation method. The sample was then equilibrated at 220° C. to erase its thermal history. Crystallization data (first cool) were acquired by cooling the sample from the melt to −90° C. at 10° C./min and equilibrated at −90° C. Finally it was heated again to 220° C. at 10° C./min to acquire additional melting data (second heat). The exothermic crystallization transition (first cool) was analyzed for peak temperature as Tc. The endothermic melting transition (second heat) was analyzed for peak temperature as Tm and for area under the peak as heat of fusion (Hf).

Materials

The LDPE (LD 617.LN), LDPE (LD 100BW), EXCEED™ PE 2018, and ENABLE™ PE 2705 were obtained from ExxonMobil Chemical Company, and their properties shown in Table 1a.

TABLE 1a

Description of Various PE Materials

| PE | Type | MI @ 2.16 kg, dg/min | Density, g/cm³ | $M_w$, kg/mol | $M_w/M_n$ | G'(vis) | Gel, % | α** (° C.) | β** (° C.) |
|---|---|---|---|---|---|---|---|---|---|
| LD 617.LN | LDPE | 25 | 0.919 | 136 | 10.1 | 0.422 | ~0 | 82 | ~−8 |
| LD 100BW | LDPE | 2.0 | 0.923 | 183 | 6.07 | 0.430 | ~0 | 66 | ~0 |
| EXCEED™ PE 2018 | mLLDPE w/o LCB | 2.0 | 0.918 | 98 | 2.09 | 0.955 | ~0 | 80 | ~−9 |
| ENABLE™ PE 2705 | mLLDPE w/LCB⁺ | 0.5 | 0.927 | 109 | 2.87 | 0.957 | ~0 | 88 | nd* |

*Not detected
**relaxation temperature measured by DMTA
⁺LCB is long chain branching Polypropylene (PP 3155) and VISTAMAXX™ random copolymer (PEC) were obtained from ExxonMobil Chemical Co. The properties of PP 3155 and PEC are shown in Table 1b. The PEC contains 16 wt % or 22 mol % C2.

Polystyrene (PS), dicumyl peroxide (DCP; melting point=39° C. to 41° C.) and the di-functional monomer, 3,9-divinyl-2,4,8,10-tetraoxaspiro[5,5]undecane (DVTU; melting point=43° C. to 46° C.; FIG. 1), were obtained from Sigma-Aldrich and used as received. Note that both DCP and DVTU have melting points well above room temperature so that they are in solid form. The properties of PS are also shown in Table 1b, below.

TABLE 1b

Characterization and Properties of PP, PEC, and PS

| Polymer | $M_w$, kg/mol | $M_w/M_n$ | g'(vis) | Gel, % | Relaxation Temperature, ° C. | $T_c$, ° C. | $T_m$, ° C. |
|---|---|---|---|---|---|---|---|
| PP | 190 | 8.02 | 1.026 | ~0 | 10 | 107 | 169 |
| PEC | 262 | 2.23 | 0.991 | ~0 | −24 | nd* | nd* |
| PS | 43 | 22.8 | 1.071 | ~0 | ** | nd* | nd* |

*Not detected
**Hard to mold a DMTA sample because PS is very brittle

Example 1

Polymer A (37.6 g), Polymer B (6.6 g), DCP (0.1 g), and DVTU (0 or 0.05 g) were accurately weighed according to the formulation used in Table 2 and were put inside a plastic bottle. These ingredients were dry mixed by shaking the bottle vigorously for 5 min. A BRABENDER™ mixer (50 g capacity) was then heated to 175° C. The entirety of the dry mix was introduced in less than 0.5 minutes into the preheated BRABENDER™ mixer. A rotor speed of 50 rpm was used throughout the run and the system was kept at temperature desired and stable. Mixing was continued for 10 minutes once all the blend components were incorporated. Finally, the blend was discharged from the mixer, cut into small pieces, and allowed to cool down. These small pieces of polymer were then placed in a vacuum oven at about 100° C. to 110° C. for about 12 hours to remove any residual decomposition products.

Figure 3:
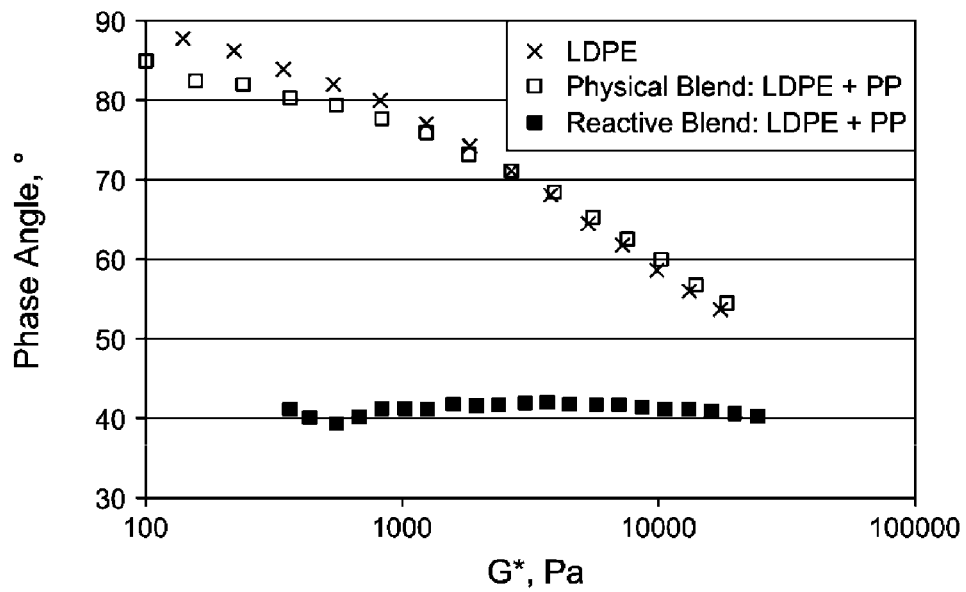
FIG. 3 depicts van Gurp-Palmen plots of LDPE and its blends with PP at 190° C.

For illustration of this invention, the blend composition of the two dissimilar polymers (Polymer A and Polymer B) was kept at a ratio of 37.4 g to 6.6 g (e.g., the concentration of Polymer B was 15 wt % and the total weight of the blend was 44 g). If DCP was used to modify the blend, the amount used was always 0.1 g based on 44 g of the blend of Polymer A (major polymer component) and Polymer B (minor polymer component). For DVTU, the amount used was always 0.05 g based on 44 g of the blend.

or FIG. 3) are lower than those of LDPE, suggesting the formation of branched composition between LDPE and PP yet this reactive blend is gel-free. This is consistent with the observation that 34-4 (the reactive blend) has better tensile properties than 40-4 (the physical blend).

Figure 4:
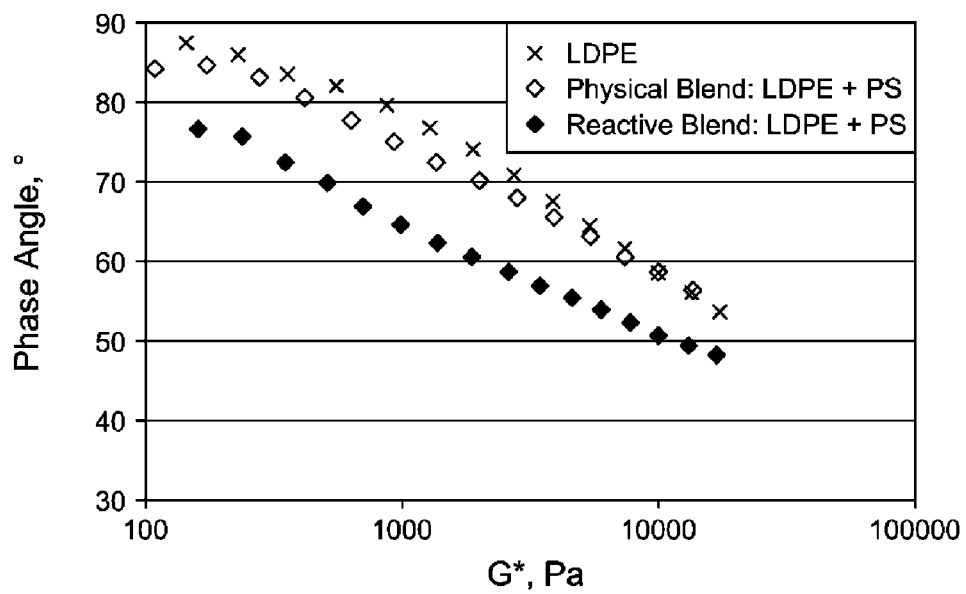
FIG. 4 depicts van Gurp-Palmen plots of LDPE and its blends with PS at 190° C.

For 40-5 (Physical Blend: LDPE+PS), g'(vis) is similar to that of LDPE. For 34-5 (Reactive Blend: LDPE+PS), both g'(vis) and δ at G*=10 kPa (Table 2 or FIG. 4) are lower than those of LDPE, suggesting the formation of branched composition between LDPE and PS. However, this reactive blend contains gel but it has slightly better tensile properties than 40-5 (the physical blend).

Figure 5:
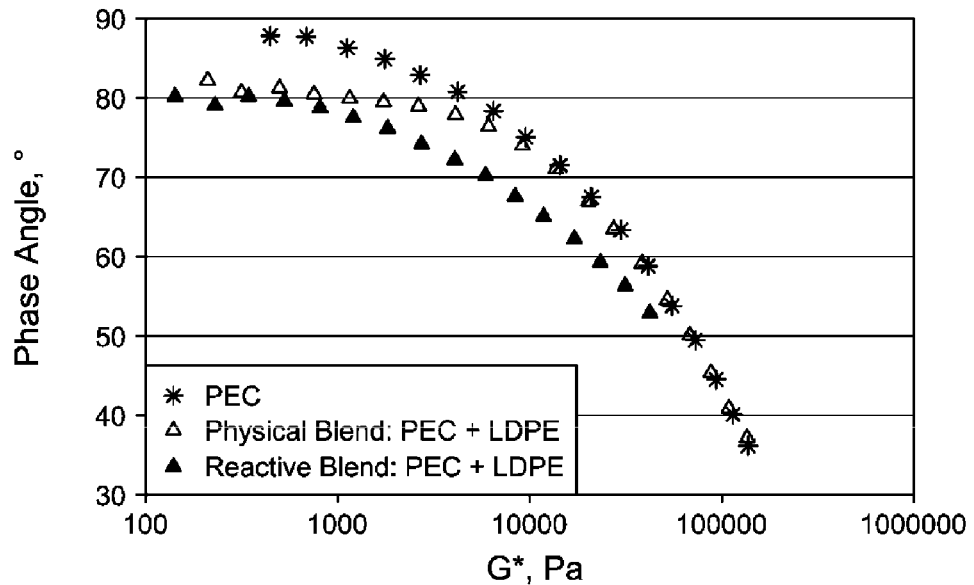
FIG. 5 depicts van Gurp-Palmen plots of PEC and its blends with LDPE (LD 617.LN) at 190° C.

For 40-1 (Physical Blend: PEC+LDPE), g'(vis) is slightly lower than that of PEC due to LDPE incorporation. For 34-1 (Reactive Blend: PEC+LDPE), both g'(vis) and δ at G*=10 kPa (Table 2 or FIG. 5) are lower than those of PEC, suggesting the formation of branched composition between PEC and LDPE; yet this reactive blend has no gel. This is consistent with the observation that 34-1 (the reactive blend) has better tensile properties than 40-1 (the physical blend).

Figure 6:
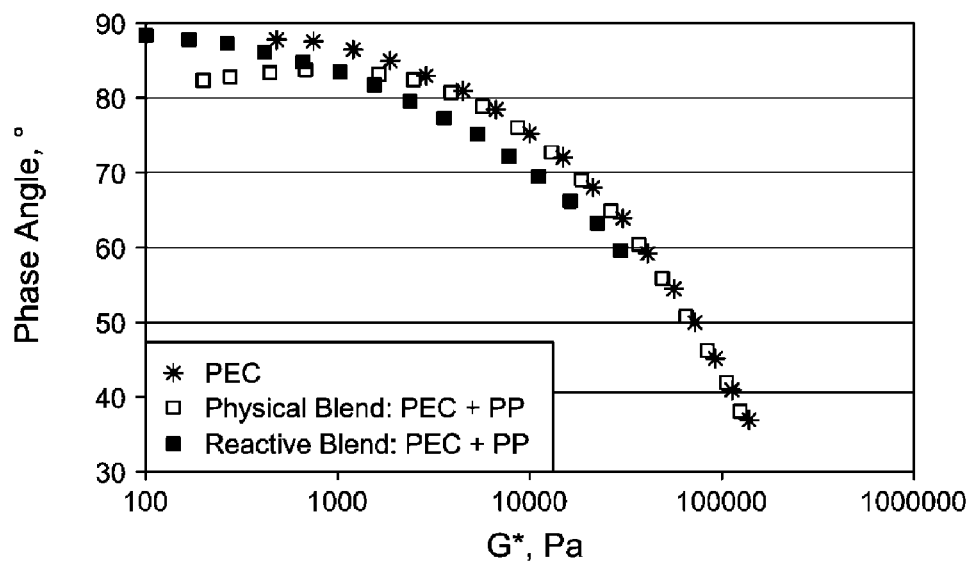
FIG. 6 depicts van Gurp-Palmen plots of PEC and its blends with PP at 190° C.

For 40-2 (Physical Blend: PEC+PP), g'(vis) is similar to that of PEC. For 34-2 (Reactive Blend: PEC+PP), both g'(vis) and δ at G*=10 kPa (Table 2 or FIG. 6) are lower than those of PEC, suggesting the formation of branched composition between PEC and PP; yet this reactive blend is gel-free. This is consistent with the observation that 34-2 (the reactive

TABLE 2

Characterization and Properties of Various Materials

| Sample No. | Polymer | DCP, g | DVTU*, g | $M_w$, kg/mol | $M_w/M_n$ | g'(vis) | Gel, % | δ** | $e_b$, % | U, MJ/m³ | $T_c$, ° C. | $T_m$, ° C. | $H_f$, J/g |
|---|---|---|---|---|---|---|---|---|---|---|---|---|---|
| 49-2 | LDPE | 0 | 0 | 136 | 10.1 | 0.422 | ~0 | 57° | | | 96 | 110 | 115 |
| 49-3 | PP | 0 | 0 | 190 | 8.02 | 1.026 | ~0 | | | | 107 | 169 | |
| 49-6 | PS | 0 | 0 | 43 | 22.8 | 1.071 | ~0 | | | | | | |
| 40-4 | 37.4 g LDPE + 6.6 g PP | 0 | 0 | 149 | 5.76 | 0.436 | ~0 | 60° | 8.5 | 0.75 | 78, 96 | 110,165 | 108, 13 |
| 34-4 | 37.4 g LDPE + 6.6 g PP | 0.1 | 0.05 | 435 | 11.1 | 0.26 | ~0 | 41° | 21 | 1.9 | 78, 94 | 111,165 | 103, 12 |
| 40-5 | 37.4 g LDPE + 6.6 g PS | 0 | 0 | 140 | 6.75 | 0.431 | ~0 | 58° | 17 | 1.5 | 96 | 110 | 93 |
| 34-5 | 37.4 g LDPE + 6.6 g PS | 0.1 | 0.05 | 248 | 10.3 | 0.333 | ~21 | 50° | 22 | 1.8 | 95 | 109 | 95 |
| 49-4 | PEC | 0 | 0 | 262 | 2.23 | 0.991 | ~0 | 73° | | | *** | *** | *** |
| 40-1 | 37.4 g PEC + 6.6 g LDPE | 0 | 0 | 237 | 3.94 | 0.844 | ~0 | 73° | 410 | 18 | 67 | 110 | 12 |
| 34-1 | 37.4 g PEC + 6.6 g LDPE | 0.1 | 0.05 | 188 | 3.92 | 0.743 | ~0 | 67° | 520 | 29 | 94 | 108 | 14 |
| 40-2 | 37.4 g PEC + 6.6 g PP | 0 | 0 | 241 | 2.52 | 1.004 | ~0 | 74° | 370 | 27 | 93 | 166 | 15 |
| 34-2 | 37.4 g PEC + 6.6 g PP | 0.1 | 0.05 | 137 | 2.60 | 0.938 | ~0 | 70° | 460 | 30 | 101 | 162 | 17 |
| 40-3 | 37.4 g PEC + 6.6 g PS | 0 | 0 | 264 | 2.08 | 0.87 | ~20 | 72° | 410 | 16 | *** | *** | *** |
| 34-3 | 37.4 g PEC + 6.6 g PS | 0.1 | 0.05 | 178 | 2.18 | 0.842 | ~15 | 66° | 490 | 21 | *** | *** | *** |

Figure 7:
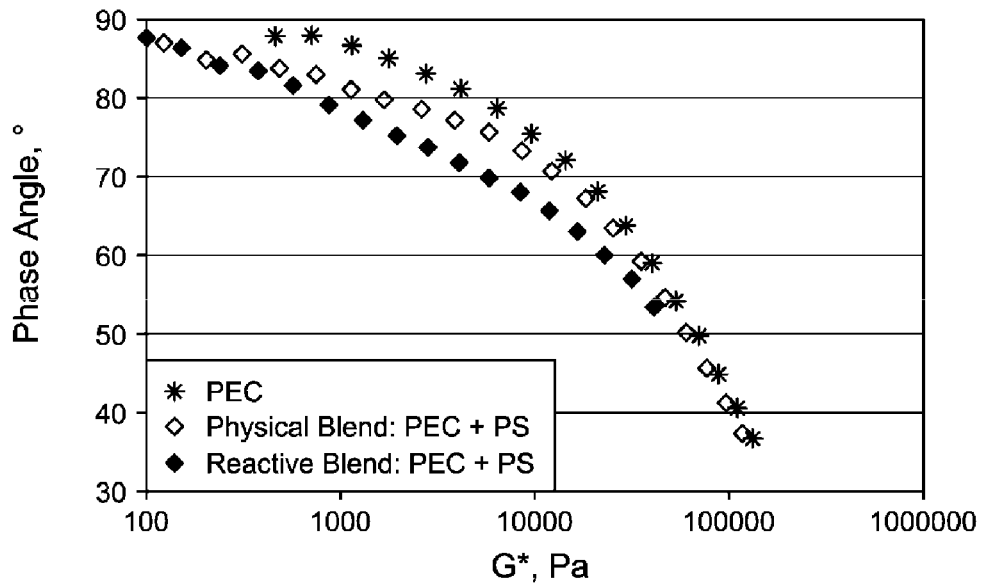
FIG. 7 depicts van Gurp-Palmen plots of PEC and its blends with PS at 190° C.

*3,9-Divinyl-2,4,8,10-tetraoxaspiro[5,5]undecane
**Phase angle at a complex modulus of 10 kPa
***Not detected Without eliminating the gel structure if present in the polymers, 34-4 (Reactive Blend: LDPE+PP) shows a lower value of phase angle (δ) in the van Gurp-Palmen plot than 49-2 (Polymer A=LDPE) and 40-4 (Physical Blend: LDPE+PP) at a given G* (FIG. 3). Overall, this is also true for LDPE blended with PS (FIG. 4), the PEC blended with LDPE (FIG. 5), the PEC blended with PP (FIG. 6), and the PEC blended with PS (FIG. 7).

As noted in Table 2, g'(vis) of 40-4 (Physical Blend: LDPE+PP) is similar to that of LDPE. For 34-4 (Reactive Blend: LDPE+PP), both g'(vis) and δ at G*=10 kPa (Table 2 or FIG. 3) are lower than those of LDPE, suggesting the blend) has better tensile properties than 40-2 (the physical blend).

For 40-3 (Physical Blend: PEC+PS), g'(vis) is slightly lower than that of PEC. For 34-3 (Reactive Blend: PEC+PS), both g'(vis) and δ at G*=10 kPa (Table 2 or FIG. 7) are lower than those of PEC, suggesting the formation of branched composition between PEC and PS. However, this reactive blend is not gel-free but it has slightly better tensile properties than 40-3 (the physical blend).

DSC data of the polymers and the branched compositions are also shown in Table 2.

Example 2

A Brabender mixer (50 g capacity) was heated to 200° C. The mixture of EXCEED™ PE 2018 and 10 wt % of 40-4 (Physical Blend: LDPE+PP), 34-4 (Reactive Blend: LDPE+PP), 40-5 (Physical Blend: LDPE+PS), or 34-5 (Reactive Blend: LDPE+PS) described in Table 2 of Example 1 was introduced in the preheated BRABENDER™ mixer together with 500 ppm of IRGANOX 1076, 1000 ppm of IRGAFOS 168, and 800 ppm of DYNAMAR FX 5920A. A rotor speed of 50 rpm was used throughout the run and the system was kept at temperature desired and stable. Mixing was continued for 10 min once all the blend components were incorporated. Finally the blend was discharged from the mixer and allowed to cool down. Table 3 shows the properties of the neat EXCEED™ PE 2018 polymer and the blend of EXCEED™ PE 2018 with 10 wt % of the various physical and reactive blends of LDPE+PP and LDPE+PS.

TABLE 3

Properties of EXCEED ™ 2018 Blended with 10 wt %

| Polymer | $\delta^{(b)}$ | degree of shear thinning | $E_o$, MPa | $e_y$, % | $\sigma_y$, MPa | $E_{100}$, MPa | $e_b$, % | $\sigma_b$, MPa | U, MJ/m$^3$ |
|---|---|---|---|---|---|---|---|---|---|
| EXCEED ™ PE 2018 | 81° | 0.57 | 348 | 22 | 11 | 11 | 320 | 33 | 54 |
| EXCEED ™ PE 2018 + 10 wt % Physical Blend: LDPE + PP (40-4) | 82° | 0.57 | 402 | 21 | 10 | 11 | 270 | 24 | 38 |
| EXCEED ™ PE 2018 + 10 wt % Reactive Blend: LDPE + PP (34-4) | 76° | 0.70 | 437 | 20 | 10 | 11 | 310 | 31 | 51 |
| EXCEED ™ PE 2018 + 10 wt % Physical Blend: LDPE + PS (40-5) | 82° | 0.56 | 387 | 21 | 11 | 11 | 320 | 32 | 53 |
| EXCEED ™ PE 2018 + 10 wt % Reactive Blend: LDPE + PS (34-5) | 78° | 0.66 | 236 | 20 | 10 | 11 | 330 | 32 | 55 |

$^{(b)}$Phase angle at a complex modulus of 10 kPa

Figure 8:
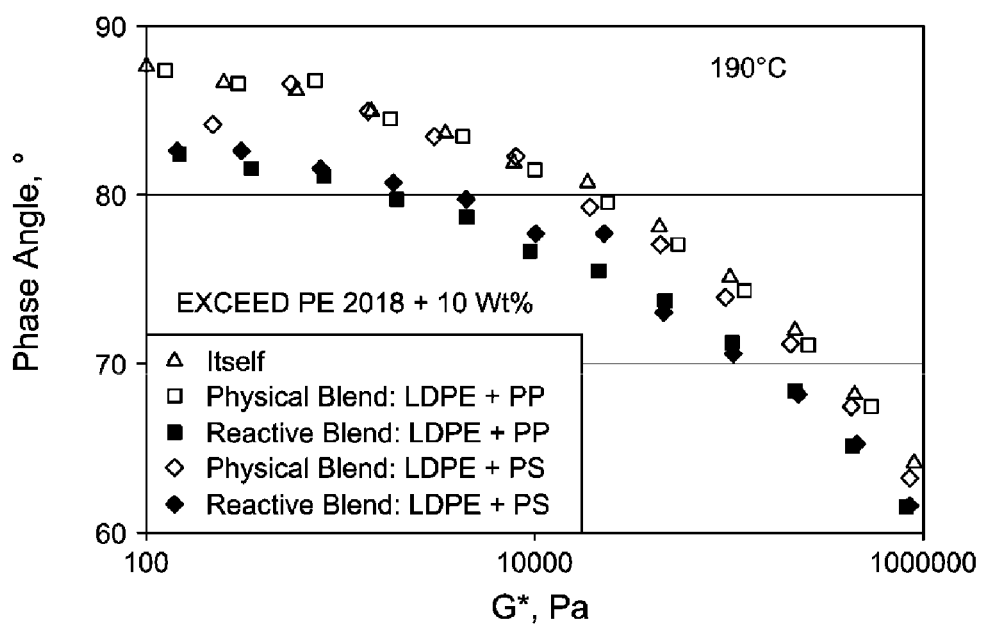
FIG. 8 depicts van Gurp-Palmen plots of EXCEED™ PE 2018 and EXCEED™ PE 2018 containing 10 wt % of various physical and reactive blends of 2 dissimilar polymers (LDPE is LD 617.LN) at 190° C.

FIG. 8 compares the van Gurp-Palmen plot of EXCEED™ PE 2018 to those of EXCEED™ PE 2018 containing 10 wt % of each of the various physical and reactive blends of LDPE+PP and LDPE+PS. Overall, EXCEED™ PE 2018 containing 10 wt % of each physical blend exhibits similar phase angle as EXCEED™ PE 2018 over the range of G* shown. However, EXCEED™ PE 2018 containing 10 wt % of each highly branched reactive blend decreases the phase angle of EXCEED™ PE 2018, thereby enhancing the melt elasticity of EXCEED™ PE 2018. In Table 3, the phase angle at G*=10 kPa is used to rank these polymeric materials. Also, each reactive blend composition, after blended with EXCEED™ PE 2018, enhances the degree of shear thinning of EXCEED™ PE 2018, whereas the physical blend composition shows little or no effects, Table 3. Of course, as mentioned before, one wants to avoid those modifiers containing gels if the application of the blend is blown film. However, this gel issue is less critical in applications involving articles with thicker sections, for example, those produced by thermoforming or other plastic molding processes.

Figure 9:
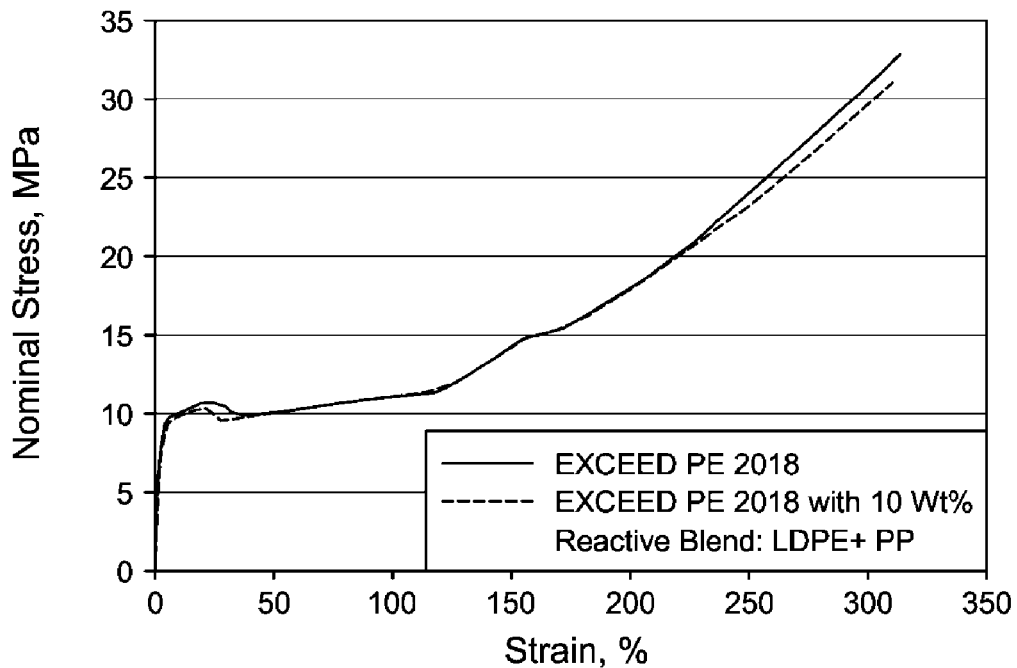
FIG. 9 depicts stress-strain curves of EXCEED™ PE 2018 and EXCEED™ PE 2018 containing 10 wt % of the highly branched Reactive Blend: LDPE (LD 617.LN)+PP.

The stress-strain properties are also shown in Table 3. The highly branched polyolefins do not produce any significant effects on the tensile properties of EXCEED™ PE 2018. FIG. 9 shows one example in which the stress-strain curve of EXCEED™ PE 2018 is compared to that of EXCEED™ PE 2018 containing 10 wt % of the highly branched Reactive Blend: LDPE+PP. Except for some slight changes in the ultimate tensile properties, EXCEED™ PE 2018 and EXCEED™ PE 2018 containing 10 wt % of Reactive Blend: LDPE+PP have very similar tensile behaviors. On the other hand, 10 wt % of Physical Blend: LDPE+PP in EXCEED™ PE 2018 decrease the ultimate tensile properties of EXCEED™ PE 2018, Table 3.

Example 3

A BRABENDER™ mixer (50 g capacity) was heated to 200° C. The mixture of ENABLE™ PE 2075 and 10 wt % of 40-4 (Physical Blend: LDPE+PP), 34-4 (Reactive Blend: LDPE+PP), 40-5 (Physical Blend: LDPE+PS), or 34-5 (Reactive Blend: LDPE+PS) described in Table 2 of Example 1 was introduced in the preheated BRABENDER™ mixer together with 500 ppm of Irganox 1076, 1000 ppm of Irgafos 168, and 800 ppm of Dynamar FX 5920A. A rotor speed of 50 rpm was used throughout the run and the system was kept at temperature desired and stable. Mixing was continued for 10 min once all the blend components were incorporated in the mLLDPE with LCB. Finally the blend was discharged from the mixer and allowed to cool down. Table 4 shows the properties of the neat ENABLE™ PE 2705 polymer and the blends of ENABLE™ PE 2705 with 10 wt % of the various physical and reactive blends of LDPE+PP and LDPE+PS.

TABLE 4

Properties of ENABLE ™ PE 2705 Blended with 10 wt % of Various Modifiers

| Polymer | $\delta^{(b)}$ | degree of shear thinning | $E_o$, MPa | $e_y$, % | $\sigma_y$, MPa | $E_{100}$, MPa | $e_b$, % | $\sigma_b$, MPa | U, MJ/m$^3$ |
|---|---|---|---|---|---|---|---|---|---|
| ENABLE ™ PE 2705 | 56° | 0.93 | 645 | 5.2 | 14 | 12 | 330 | 32 | 57 |
| ENABLE PE 2705 + 10 wt % Physical Blend: LDPE + PP (40-4) | 57° | 0.93 | 450 | 5.4 | 13 | 12 | 330 | 29 | 54 |

TABLE 4-continued

Properties of ENABLE ™ PE 2705 Blended with 10 wt % of Various Modifiers

| Polymer | $\delta^{(b)}$ | degree of shear thinning | $E_o$, MPa | $e_y$, % | $\sigma_y$, MPa | $E_{100}$, MPa | $e_b$, % | $\sigma_b$, MPa | U, MJ/m³ |
|---|---|---|---|---|---|---|---|---|---|
| ENABLE ™ PE 2705 + 10 wt % Reactive Blend: LDPE + PP (34-4) | 55° | 0.94 | 643 | 5.5 | 13 | 12 | 320 | 29 | 52 |
| ENABLE ™ PE 2705 + 10 wt % Physical Blend: LDPE + PS (40-5) | 57° | 0.93 | 671 | 5.4 | 13 | 11 | 320 | 28 | 51 |
| ENABLE ™ PE 2705 + 10 wt % Reactive Blend: LDPE + PS (34-5) | 56° | 0.93 | 644 | 5.5 | 13 | 12 | 310 | 28 | 50 |

$^{(b)}$Phase angle at a complex modulus of 10 kPa

Figure 10:
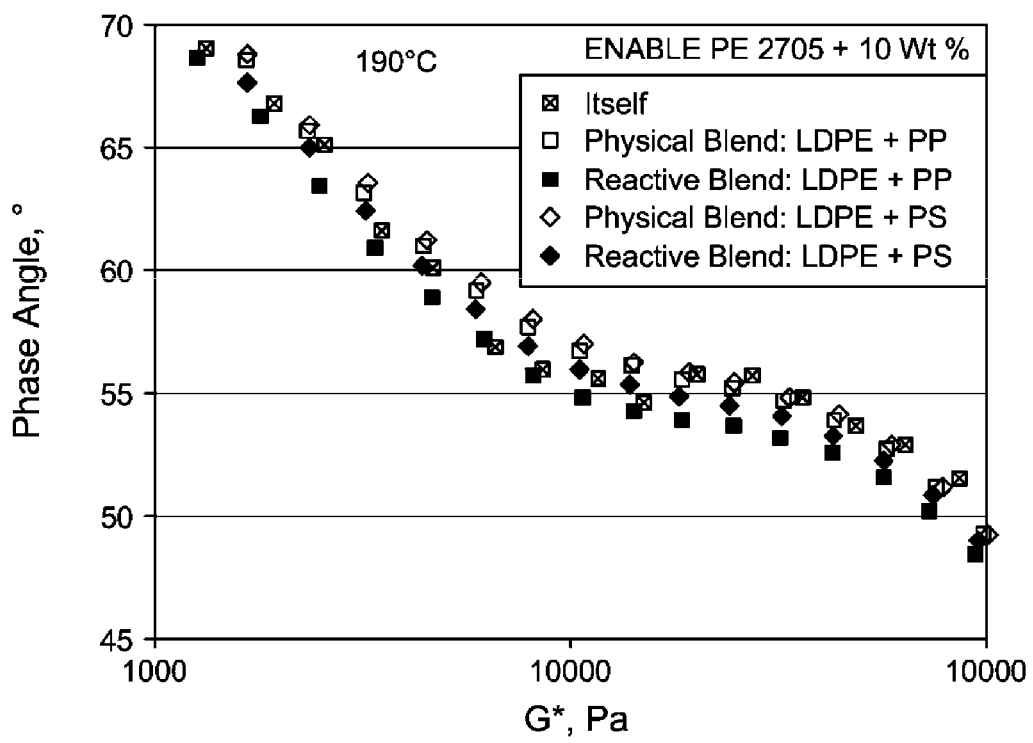
FIG. 10 depicts van Gurp-Palmen plots of ENABLE™ PE 2705 and ENABLE™ PE 2705 containing 10 wt % of various physical and reactive blends of 2 dissimilar polymers at 190° C. (LDPE is LD 617.LN).

FIG. 10 compares the van Gurp-Palmen plot of ENABLE™ PE 2705 to those of ENABLE™ PE 2705 containing 10 wt % of each of the various physical and reactive blends of LDPE+PP and LDPE+PS. Overall, ENABLE™ PE 2705 containing 10 wt % of each physical blend exhibits similar phase angle as ENABLE™ PE 2705 over the range of G* shown. However, ENABLE™ PE 2705 containing 10 wt % of the highly branched Reactive Blend: LDPE+PP decreases the phase angle of ENABLE™ PE 2705 slightly, thereby enhancing the melt elasticity of ENABLE™ PE 2705. The Reactive Blend: LDPE+PS has no effects on the phase angle of ENABLE™ PE 2705. In Table 4, the phase angle at G*=10 kPa is used to rank these polymeric materials. Also, the Reactive Blend: LDPE+PP, after blended with ENABLE™ PE 2705, enhances the degree of shear thinning of ENABLE™ PE 2705 slightly, whereas the physical blend compositions and the Reactive Blend: LDPE+PS show little or no effects. As mentioned before, one wants to avoid those modifiers containing gels if the application of the blend is blown film. Of course, this gel issue is less critical in applications involving articles with thicker sections, for example, those produced by thermoforming or other plastic molding processes.

Figure 11:
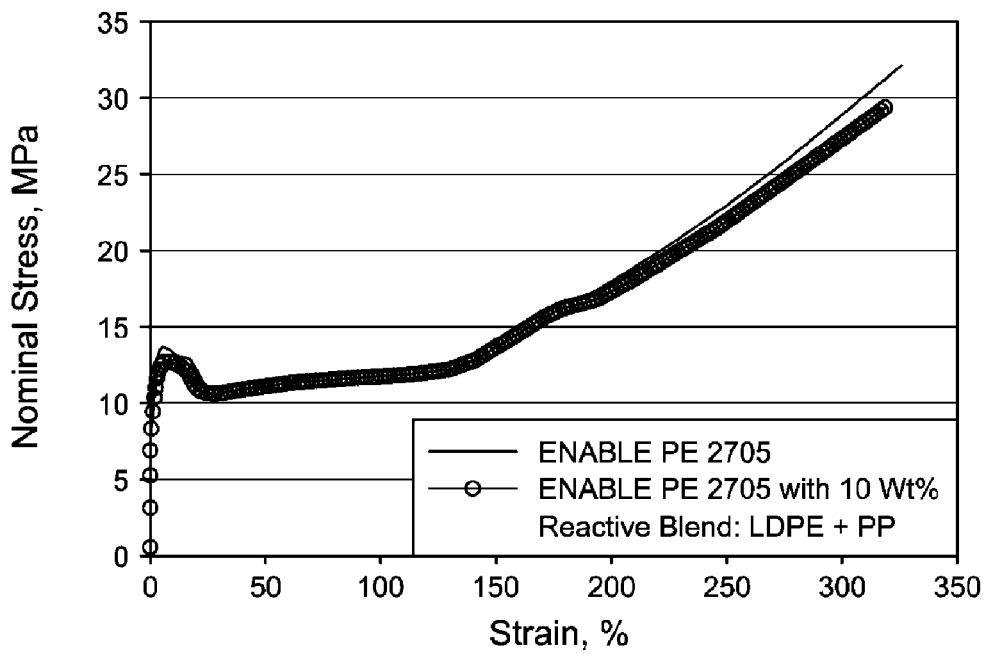
FIG. 11 depicts stress-strain curves of ENABLE™ PE 2705 and ENABLE™ PE 2705 containing 10 wt % of the highly branched Reactive Blend: LDPE (LD 617.LN)+PP.

The stress-strain properties of the neat ENABLE™ PE 2705 polymer and the blends of ENABLE™ PE 2705 with 10 wt % of the various physical and reactive blends of LDPE+PP and LDPE+PS are also shown in Table 4. Except for some changes in the ultimate tensile properties, ENABLE™ PE 2705 has similar tensile behaviors to ENABLE™ PE 2705 containing 10 wt % of the various physical and reactive blends. FIG. 11 shows one example in which the stress-strain curve of ENABLE™ PE 2705 is compared to that of ENABLE™ PE 2705 containing 10 wt % of the Reactive Blend: LDPE+PP.

Besides mLLDPEs, the LCB-PE, such as ENABLE™ PE 2705, can be blended with the highly branched Reactive Blend: LDPE+PP containing two different types of polymeric LCB to further improve the melt elasticity and processability of the LCB-PE.

Example 4

LDPE pellets (44 g), DCP (0.1 g), and DVTU (0, 0.05, 0.1 or 0.2 g) were accurately weighed according to the formulation described in Table 5 and were put inside a plastic bottle. These ingredients were dry mixed by shaking the bottle vigorously for 5 min. A BRABENDER™ mixer (50 g capacity) was then heated to 175° C. The dry mix was introduced in a fast rate (completed in less than 0.5 min) into the preheated BRABENDER™ mixer. A rotor speed of 50 rpm was used throughout the run and the system was kept at temperature desired and stable. Mixing was continued for 10 min once all the blend components were incorporated. Finally the blend was discharged from the mixer, cut into small pieces, and allowed to cool down. These small pieces of polymers were then placed in a vacuum oven at about 100° C. to 110° C. for about 12 hr to remove any residual decomposition products.

In Table 5, if DCP was used to modify LDPE, it was always at 0.1 g based on 44 g of LDPE. For DVTU, it was at 0, 0.05, 0.1, or 0.2 g based on 44 g of LDPE. Because the starting LDPE already contains branches and the free radical chemistry, for example using DCP or DCP/DVTU in this invention, does not produce any chain scissions in PE, the resulting polymer is thought to have a branch-on-branch composition. Therefore, gel typically occurred in the highly branched polymer if a higher concentration of DVTU was used. However, LD 617.LN is less prone to gel than LD 100BW under given preparation/modification conditions. Usually the degree of polymer branching is well described by g'(vis): the higher the degree of branching, the lower is the g'(vis). However, a caution is that, because the SEC will filter out the gel, the values of g'(vis) of Br-LD 100BW-3, Br-LD 100BW-4, and Br-LD 617.LN-4 are higher than the other branched compositions without gel, such as Br-LD 100BW-1, Br-LD 100BW-2, Br-LD 617.LN-1, Br-LD 617.LN-2, and Br-LD 617.LN-3. In other words, less than about 0.1 g of DVTU should be used under the aforementioned experimental conditions to produce gel-free branched compositions of LD 100BW. On the other hand, less than about 0.2 g of DVTU should be used under the aforementioned experimental conditions to produce gel-free branched compositions of LD 617.LN.

TABLE 5

Characterization and Properties of LDPE Materials

| Branched Polymer Product (Br-__) | LDPE | DCP, g | DVTU[a], g | $M_w$, kg/mol | $M_w/M_n$ | G' (vis) | Gel, % | MI, 2.16 kg | MI, 21.6 kg | $δ^{(b)}$ | $T_c$, °C. | $T_m$, °C. | $H_f$, J/g |
|---|---|---|---|---|---|---|---|---|---|---|---|---|---|
| LD 100BW | — | — | — | 183 | 6.07 | 0.43 | ~0 | 2 | 99 | 53° | 94 | 110 | 115 |
| Br-LD 100BW-1 | 44 g LD 100BW | 0.1 | 0 | 508 | 9.88 | 0.291 | ~0 | ** | 11 | 42° | 93 | 111 | 119 |
| Br-LD 100BW-2 | 44 g LD 100BW | 0.1 | 0.05 | 508 | 10.4 | 0.285 | ~0 | ** | 3.6 | 39° | 93 | 110 | 120 |
| Br-LD 100BW-3 | 44 g LD 100BW | 0.1 | 0.1 | 153 | 7.08 | 0.5 | ~36 | ** | 1.1 | 23° | 92 | 110 | 118 |
| Br-LD 100BW-4 | 44 g LD 100BW | 0.1 | 0.2 | 78 | 7.73 | 0.517 | ~38 | ** | ** | 12° | 92 | 110 | 123 |
| LD 617.LN | — | — | — | 136 | 10.13 | 0.422 | ~0 | 25 | *** | 57° | 96 | 110 | 115 |
| Br-LD 617.LN-1 | 44 g LD 617.LN | 0.1 | 0 | 294 | 9.66 | 0.33 | ~0 | 6.4 | 245 | 51° | 95 | 111 | 120 |
| Br-LD 617.LN-2 | 44 g LD 617.LN | 0.1 | 0.05 | 395 | 13.0 | 0.273 | ~0 | 3.2 | 160 | 49° | 95 | 111 | 107 |
| Br-LD 617.LN-3 | 44 g LD 617.LN | 0.1 | 0.1 | 311 | 16.3 | 0.308 | ~0 | ** | 22 | 38° | 95 | 110 | 119 |
| Br-LD 617.LN-4 | 44 g LD 617.LN | 0.1 | 0.2 | 176 | 9.92 | 0.395 | ~24 | ** | 13 | 33° | 94 | 111 | 119 |

Figure 12:
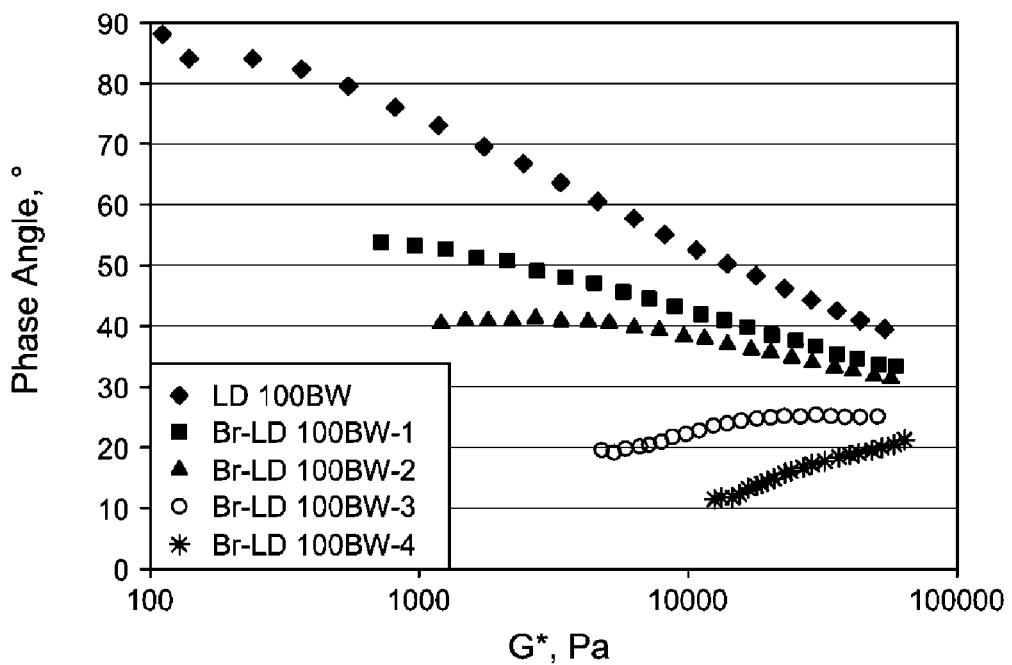
FIG. 12 depicts van Gurp-Palmen plot of LD 100BW and its highly branched derivatives at 190° C.
Figure 13:
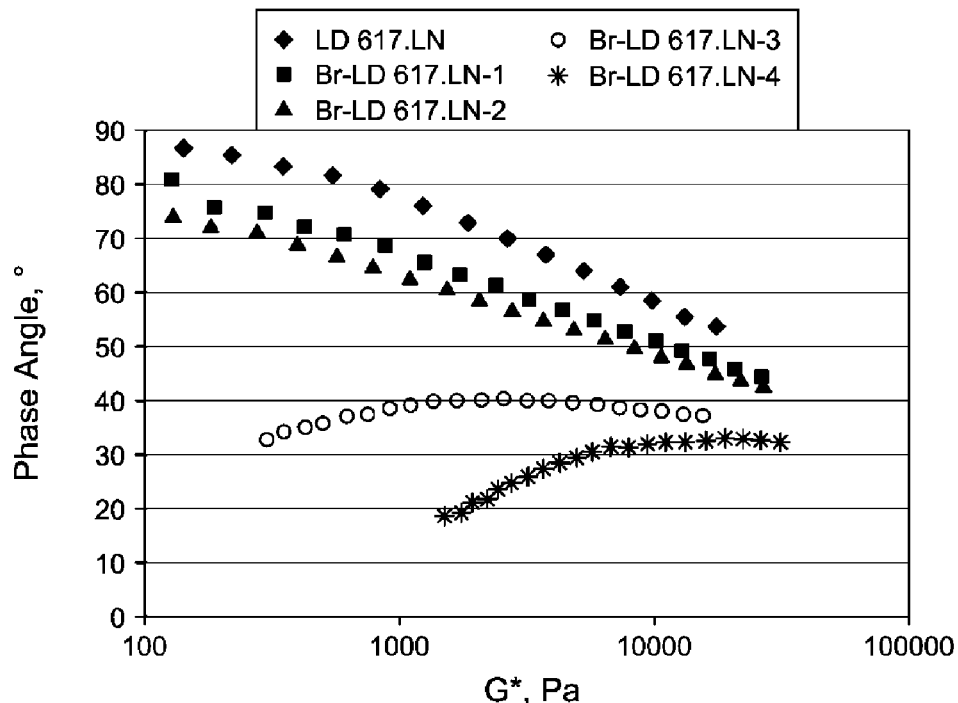
FIG. 13 depicts van Gurp-Palmen plot of LD 617.LN and its highly branched derivatives at 190° C.

[a]3,9-divinyl-2,4,8,10-tetraoxaspiro[5,5]undecane
[b]Phase angle at a complex modulus of 10 kPa
**Hard to force out of barrel
***Very quick exit of sample out of barrel Without separating the gel structure if present in the polymer, MI at either 2.16 or 21.6 kg of the modified LDPE decreases with increasing amount of DVTU used to modify LDPE. This is consistent with the rheological data expressed in the van Gurp-Palmen plot that the phase angle (δ), decreases with increasing amount of DVTU at a given G* (FIG. 12 for LD 100BW and FIG. 13 for LD 617.LN). A lower phase angle at a given G* means a higher melt elasticity.

DSC data of the polymers and the branched compositions are also shown in Table 5. Introducing more branching to LDPE produces insignificant effects on the thermal properties, such as Tc, Tm, and Hf, of the polymer.

Table 6 shows the shear thinning data and the stress-strain properties. Increasing amount of DVTU in LDPE not only improves the melt elasticity, they also enhance shear thinning of the LDPE. The branched compositions based on LD 100BW exhibit different tensile behaviors compared to those based on LD 617.LN. For branched compositions based on LD 100BW, Eo, and ey do not vary considerably with increasing branching or gel. However, σy, eb, σb, and U appear to increase first and then decrease with increasing branching or gel. For branched compositions based on LD 617.LN, Eo, ey, and σy do not vary considerably with increasing branching. However, eb, σb, and U of the branched compositions appear to improve significantly when compared to the precursor LD 617.LN polymer. Therefore, the stress-strain properties of the branched compositions can be controlled by both the type of LDPE and the ratio of LDPE/peroxide/di-functional monomer used to produce the inventive materials.

TABLE 6

Shear Thinning and Tensile Properties of Various LDPE Materials

| Polymer | $δ^{(b)}$ | degree of shear thinning | $E_o$, MPa | $e_y$, % | $σ_y$, MPa | $e_b$, % | $σ_b$, MPa | U, MPa |
|---|---|---|---|---|---|---|---|---|
| LD 100BW | 53° | 0.93 | 409 | 6.8 | 9.3 | 220 | 13 | 23 |
| Br-LD 100BW-1 | 42° | 0.98 | 421 | 7.1 | 9.6 | 230 | 16 | 26 |
| Br-LD 100BW-2 | 39° | 0.98 | 418 | 6.7 | 9.2 | 240 | 16 | 27 |
| Br-LD 100BW-3 | 23° | 0.99 | 445 | 6.1 | 8.8 | 190 | 11 | 14 |
| Br-LD 100BW-4 | 12° | 1.00 | 416 | 6.1 | 8.7 | 130 | 12 | 13 |
| LD 617.LN | 57° | 0.68 | 478 | 6.4 | 8.8 | 61 | 7.8 | 5.0 |
| Br-LD 617.LN-1 | 51° | 0.91 | 393 | 7.1 | 8.9 | 190 | 10 | 16 |
| Br-LD 617.LN-2 | 49° | 0.93 | 369 | 7.8 | 8.6 | 200 | 11 | 17 |
| Br-LD 617.LN-3 | 38° | 0.98 | 391 | 6.1 | 8.8 | 190 | 11 | 17 |
| Br-LD 617.LN-4 | 33° | 0.99 | 426 | 7.7 | 9.0 | 150 | 11 | 14 |

[a]3,9-Divinyl-2,4,8,10-tetraoxaspiro[5,5]undecane
[b]Phase angle at a complex modulus of 10 kPa Example 5

A BRABENDER™ mixer (50 g capacity) was heated to 200° C. A mixture of EXCEED™ PE 2018 and one of the gel-free modifiers described in Table 5 was introduced in the preheated BRABENDER™ mixer together with 500 ppm of IRGANOX 1076, 1000 ppm of IRGAFOS 168, and 800 ppm of DYNAMAR FX 5920A. A rotor speed of 50 rpm was used throughout the run and the system was kept at a stable temperature desired and stable. Mixing was continued for 10 min once all the blend components were incorporated. Finally the blend was discharged from the mixer and allowed to cool down. Table 7 shows the blend properties compared to the neat EXCEED™ PE 2018 polymer.

TABLE 7

Properties of EXCEED ™ PE 2018 Blended with 10 wt % of Various Modifiers from Table 6

| Polymer | $\delta^{(b)}$ | degree of shear thinning | $E_o$, MPa | $e_y$, % | $\sigma_y$, MPa | $E_{100}$, MPa | $e_b$, % | $\sigma_b$, MPa | U, MJ/m³ |
|---|---|---|---|---|---|---|---|---|---|
| EXCEED ™ PE 2018 | 81° | 0.57 | 348 | 22 | 11 | 11 | 320 | 33 | 54 |
| EXCEED ™ PE 2018 + 10 Wt % LD 100BW | 79° | 0.61 | 355 | 21 | 11 | 11 | 310 | 31 | 51 |
| EXCEED ™ PE 2018 + 10 Wt % Br-LD 100BW-1 | 72° | 0.78 | 374 | 24 | 11 | 11 | 310 | 30 | 49 |
| EXCEED ™ PE 2018 + 10 Wt % Br-LD 100BW-2 | 71° | 0.79 | 436 | 20 | 11 | 11 | 300 | 28 | 46 |
| EXCEED ™ PE 2018 + 10 Wt % LD 617.LN | 79° | 0.61 | 402 | 21 | 10 | 11 | 290 | 27 | 43 |
| EXCEED ™ PE 2018 + 10 Wt % Br-LD 617.LN-1 | 74° | 0.72 | 426 | 21 | 11 | 11 | 330 | 32 | 54 |
| EXCEED ™ PE 2018 + 10 Wt % Br-LD 617.LN-2 | 73° | 0.76 | 392 | 18 | 11 | 11 | 320 | 32 | 54 |
| EXCEED ™ PE 2018 + 10 Wt % Br-LD 617.LN-3 | 73° | 0.77 | 355 | 22 | 10 | 11 | 320 | 31 | 51 |

$^{(b)}$Phase angle at a complex modulus of 10 kPa

Ten wt % of various highly branched compositions lowered the phase angle of EXCEED™ PE 2018. A lower phase angle at a given G* means a higher melt elasticity. Also, 10 wt % of these highly branched polymers in EXCEED™ PE 2018 enhance the degree of shear thinning of the host EXCEED™ PE 2018.

Figure 14:
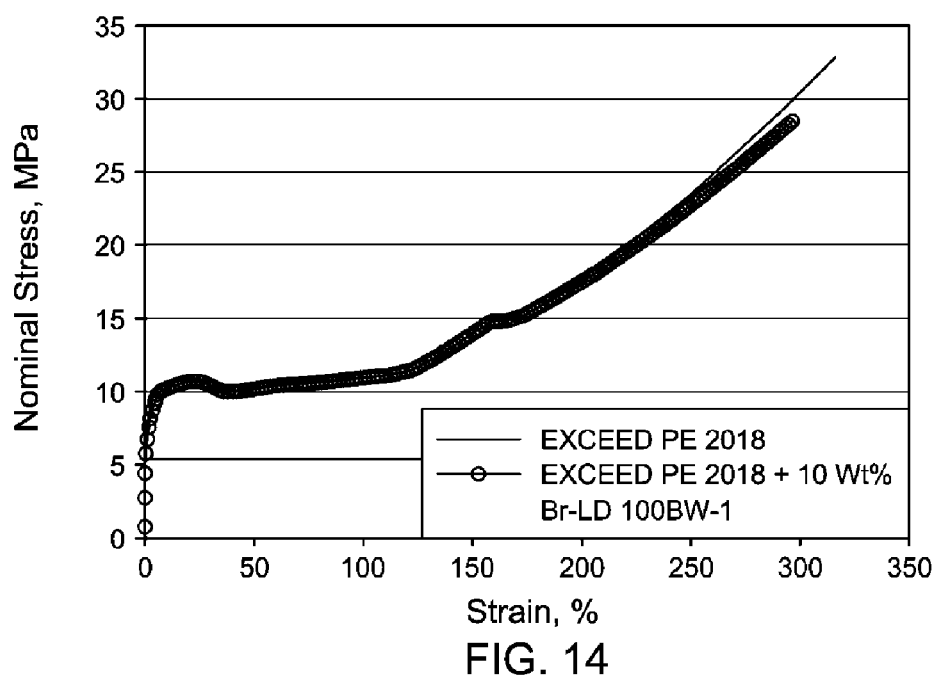
FIG. 14 depicts stress-strain curves of EXCEED™ PE 2018 and EXCEED™ PE 2018 containing 10 wt % of one of the highly branched PE compositions.

The stress-strain properties are shown in Table 7. The inventive branched polymers do not negatively impact the tensile properties of EXCEED™ PE 2018. FIG. 14 shows one example in which the stress-strain curve of EXCEED™ PE 2018 was compared to that of EXCEED™ PE 2018 containing 10 wt % of Br-LD 100BW-1. Except for some changes in the ultimate tensile properties, EXCEED™ PE 2018 and EXCEED™ PE 2018 containing 10 wt % of Br-LD 100BW-1 have very similar tensile behaviors.

Example 6

A BRABENDER™ mixer (50 g capacity) was heated to 200° C. The mixture of ENABLE™ PE 2705 and one of the modifiers described in Table 5 was introduced in the preheated BRABENDER™ mixer together with 500 ppm of IRGANOX 1076, 1000 ppm of IRGAFOS 168, and 800 ppm of DYNAMAR FX 5920A. A rotor speed of 50 rpm was used throughout the run and the system was kept at temperature desired and stable. Mixing was continued for 10 min once all the blend components were incorporated. Finally, the blend was discharged from the mixer and allowed to cool down. Table 8 shows the properties of the neat ENABLE™ PE 2705 polymer and the blends of ENABLE™ PE 2705 with 10 wt % of the various branched LD 100BW and LD 617.LN compositions.

TABLE 8

Properties of ENABLE ™ PE 2705 Blended with 10 wt % of Various Modifiers from Table 6

| Polymer | $\delta^{(b)}$ | degree of shear thinning | $E_o$, MPa | $e_y$, % | $\sigma_y$, MPa | $E_{100}$, MPa | $e_b$, % | $\sigma_b$, MPa | U, MJ/m³ |
|---|---|---|---|---|---|---|---|---|---|
| ENABLE ™ PE 2705 | 56° | 0.93 | 645 | 5.2 | 14 | 12 | 330 | 32 | 57 |
| ENABLE ™ PE 2705 + 10 Wt % LD 100BW | 56° | 0.94 | 648 | 5.4 | 13 | 12 | 320 | 29 | 53 |
| ENABLE ™ PE 2705 + 10 Wt % Br-LD 100BW-1 | 54° | 0.94 | 631 | 5.2 | 13 | 12 | 320 | 30 | 54 |
| ENABLE ™ PE 2705 + 10 Wt % Br-LD 100BW-2 | 55° | 0.94 | 646 | 5.1 | 13 | 12 | 310 | 29 | 50 |
| ENABLE ™ PE 2705 + 10 Wt % Br-LD 100BW-3 | 54° | 0.94 | 619 | 5.7 | 13 | 12 | 310 | 30 | 53 |
| ENABLE ™ PE 2705 + 10 Wt % Br-LD 100BW-4 | 53° | 0.95 | 612 | 5.1 | 13 | 12 | 300 | 29 | 49 |
| ENABLE ™ PE 2018 + 10 Wt % LD 617.LN | 57° | 0.93 | 595 | 5.4 | 12 | 12 | 320 | 30 | 53 |

TABLE 8-continued

Properties of ENABLE ™ PE 2705 Blended with
10 wt % of Various Modifiers from Table 6

| Polymer | $\delta^{(b)}$ | degree of shear thinning | $E_o$, MPa | $e_y$, % | $\sigma_y$, MPa | $E_{100}$, MPa | $e_b$, % | $\sigma_b$, MPa | U, MJ/m$^3$ |
|---|---|---|---|---|---|---|---|---|---|
| ENABLE ™ PE 2018 + 10 Wt % Br-LD 617.LN-1 | 56° | 0.94 | 612 | 5.1 | 13 | 12 | 320 | 29 | 52 |
| ENABLE ™ PE 2018 + 10 Wt % Br-LD 617.LN-2 | 56° | 0.94 | 636 | 5.0 | 13 | 12 | 320 | 29 | 52 |
| ENABLE ™ PE 2018 + 10 Wt % Br-LD 617.LN-3 | 53° | 0.95 | 640 | 5.3 | 13 | 12 | 320 | 30 | 54 |
| ENABLE ™ PE 2018 + 10 Wt % Br-LD 617.LN-4 | 55° | 0.94 | 787 | 5.2 | 14 | 12 | 300 | 27 | 48 |

$^{(b)}$phase angle at a complex modulus of 10 kPa

Figure 15:
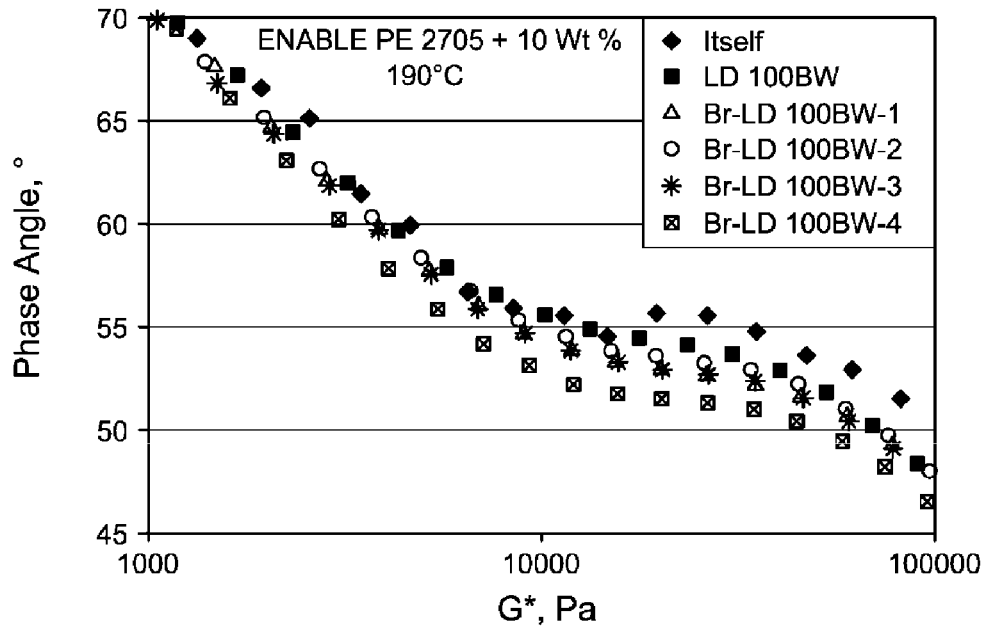
FIG. 15 depicts van Gurp-Palmen plots of ENABLE™ PE 2705 and ENABLE™ PE 2705 containing 10 wt % of LD 100BW and each of the branched LD 100BW compositions at 190° C.

FIG. 15 compares the van Gurp-Palmen plot of ENABLE™ PE 2705 to those of ENABLE™ PE 2705 containing 10 wt % of each of the branched LD 100BW described in Table 5. Overall, the various Br-LD 100BW compositions decrease the phase angle of ENABLE™ PE 2705, thereby enhancing the melt elasticity or melt strength of ENABLE™ PE 2705. In Table 8, the phase angle at G*=10 kPa is used to rank these polymeric materials. Also, these Br-LD 100BW compositions, after blended with ENABLE™ PE 2705, produce some slight enhancements in the degree of shear thinning, Table 8. Of course, one wants to avoid those modifiers containing gels if the application of the blend is blown film. However, this gel issue is less critical in applications involving articles with thicker sections, for example, those produced by thermoforming or other plastic molding processes.

Figure 16:
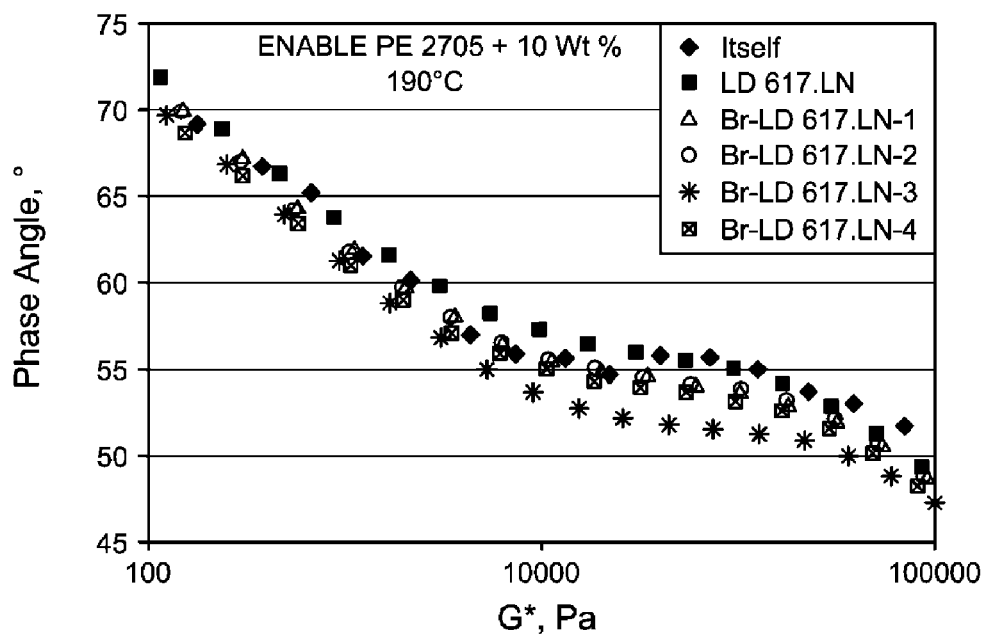
FIG. 16 depicts van Gurp-Palmen plots of ENABLE™ PE 2705 and ENABLE™ PE 2705 containing 10 wt % of LD 617.LN and each of the branched LD 617.LN compositions at 190° C.

FIG. 16 compares the van Gurp-Palmen plot of ENABLE™ PE 2705 to those of ENABLE™ PE 2705 containing 10 wt % of each of the branched LD 617.LN compositions shown in Table 5. Overall, the various Br-LD 617.LN compositions decrease the phase angle of ENABLE™ PE 2705, thereby enhancing the melt elasticity or melt strength of ENABLE™ PE 2705. Also, these various Br-LD 617.LN compositions, after blended with ENABLE™ PE 2705, produce some slight enhancements in the degree of shear thinning, Table 8. Again, one wants to avoid those modifiers containing gels when blown film is the application of the blend. However, this gel issue is less critical in applications involving articles with thicker sections, for example, those produced by thermoforming or other plastic molding processes.

Figure 17:
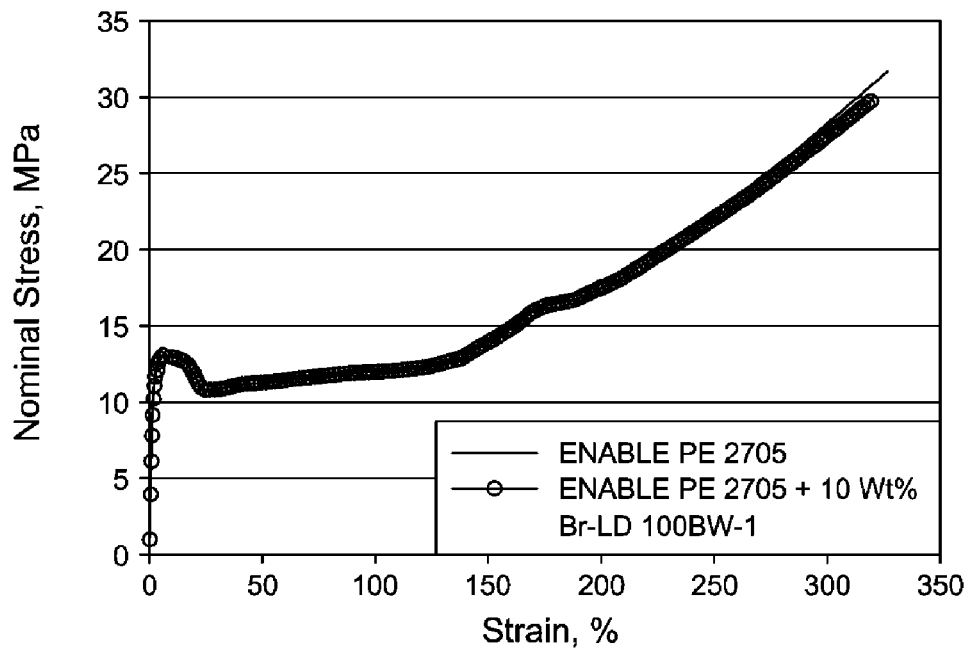
FIG. 17 depicts stress-strain curves of ENABLE™ PE 2705 and ENABLE™ PE 2705 containing 10 wt % of one of the highly branched PE compositions.

The stress-strain properties of the neat ENABLE™ PE 2705 polymer and the blends of ENABLE™ PE 2705 with 10 wt % of the various branched LD 100BW and LD 617.LN compositions are also shown in Table 8. The inventive branched polymers do not negatively impact the tensile properties of ENABLE™ PE 2705. FIG. 17 shows one example in which the stress-strain curve of ENABLE™ PE 2705 was compared to that of ENABLE™ PE 2705 containing 10 wt % of Br-LD 100BW-1. Except for some changes in the ultimate tensile properties, ENABLE™ PE 2705 has similar tensile behaviors to ENABLE™ PE 2705 containing 10 wt % of Br-LD 100BW-1.

Example 7

A BRABENDER™ mixer (50 g capacity) was heated to 200° C. The mixture of EXCEED™ PE 2018, the reactive blend of LDPE+PP (Table 2), and one of the Br-LD 100BW or Br-LD 617.LN composition (Table 5) was introduced in the preheated BRABENDER™ mixer together with 500 ppm of IRGANOX 1076, 1000 ppm of IRGAFOS 168, and 800 ppm of DYNAMAR FX 5920A. A rotor speed of 50 rpm was used throughout the run and the system was kept at the temperature desired and stable. Mixing was continued for 10 min once all the blend components were incorporated. Finally, the blend was discharged from the mixer and allowed to cool down.

Table 9 shows the blend properties compared to the neat EXCEED™ PE 2018 polymer, where the reactive blend of LDPE+PP (34-4 from Table 3) is denoted as BGC (branched graft copolymer of LDPE and PP).

TABLE 9

Properties of EXCEED ™ PE 2018 Mixed with 10 Wt % of Blend of Two Modifiers

| Polymer | $\delta_{(b)}$ | degree of shear thinning | $E_o$, MPa | $e_y$, % | $\sigma_y$, MPa | $E_{100}$, MPa | $e_b$, % | $\sigma_b$, MPa | U, MJ/m$^3$ |
|---|---|---|---|---|---|---|---|---|---|
| EXCEED ™ PE 2018 | 81° | 0.57 | 348 | 22 | 11 | 11 | 320 | 33 | 54 |
| EXCEED ™ PE 2018 + 5 Wt % BGC + 5 Wt % Br-LD 617.LN-3 | 79° | 0.65 | 353 | 23 | 10 | 11 | 310 | 29 | 47 |
| EXCEED ™ PE 2018 + 5 Wt % BGC + 5 Wt % Br-LD 617.LN-1 | 78° | 0.68 | 271 | 25 | 10 | 11 | 290 | 27 | 42 |

TABLE 9-continued

Properties of EXCEED ™ PE 2018 Mixed with 10 Wt % of Blend of Two Modifiers

| Polymer | $\delta_{(b)}$ | degree of shear thinning | $E_o$, MPa | $e_y$, % | $\sigma_y$, MPa | $E_{100}$, MPa | $e_b$, % | $\sigma_b$, MPa | U, MJ/m³ |
|---|---|---|---|---|---|---|---|---|---|
| EXCEED ™ PE 2018 + 5 Wt % BGC + 5 Wt % Br-LD 100BW-1 | 77° | 0.69 | 301 | 23 | 10 | 11 | 310 | 31 | 51 |

(b)Phase angle at a complex modulus of 10 kPa

Ten wt % of the blend of two branched compositions appears to lower the phase angle of EXCEED™ PE 2018. A lower phase angle at a given G* typically means a higher melt elasticity or melt strength. Also, 10 wt % of these highly branched polymers in EXCEED™ PE 2018 may enhance the degree of shear thinning of the host EXCEED™ PE 2018. Since the BGC is based on the reactive blending of LD 617.LN+PP, it is surprising to observe that the blend of this BGC with the branched composition of a different LDPE, LD 100BW, improves the performance of EXCEED™ PE 2018 more than the blend of this BGC with the branched composition of the same LDPE, LD 617.LN.

Figure 18:
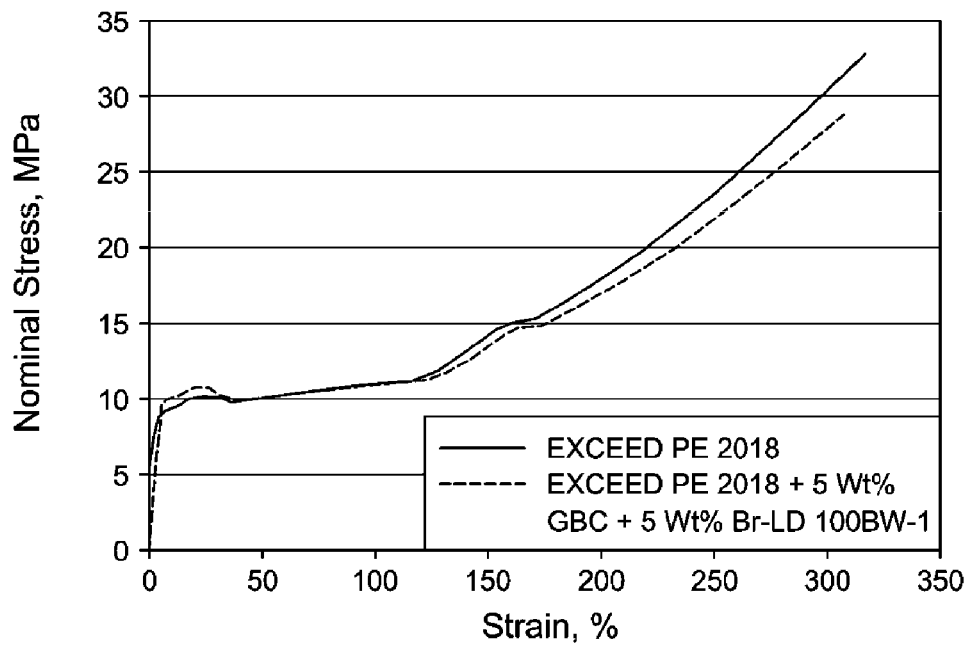
FIG. 18 depicts stress-strain curves of EXCEED™ PE 2018 and EXCEED™ PE 2018 containing 5 wt % of BGC (inventive highly branched copolymer of LDPE and PE) and 5 wt % of Br-LD 100BW-1 (where LDPE is LN 617.LN).

The stress-strain properties are also shown in Table 9. The branched polymers do not negatively impact the tensile properties of EXCEED™ PE 2018. FIG. 18 shows one example in which the stress-strain curve of EXCEED™ PE 2018 was compared to that of EXCEED™ PE 2018 containing 10 wt % of the blend of BGC and Br-LD 100BW-1. Except for some changes in the ultimate tensile properties, EXCEED™ PE 2018 and EXCEED™ PE 2018 containing 10 wt % of the blend of BGC and Br-LD 100BW-1 have similar tensile behaviors.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A highly branched polyolefin, comprising:
   units derived from olefins and at least one multi-functional monomer unit derived from 3,9-divinyl-2,4,8,10-tetraoxaspiro[5,5]undecane;
   wherein the highly branched polyolefin has:
   (i) a branching index, g'(vis), of less than about 0.7;
   (ii) a phase angle, θ, of less than about 55 degrees at a complex modulus of 10 kPa, measured at 190° C.;
   (iii) a gel content of less than or equal to about 10%;
   (iv) a melting point of less than about 135° C.; and
   wherein the highly branched polyolefin is obtained by contacting one or more polyolefins with a free radical generator, a multi-functional monomer, and a modifying polymer dissimilar to the polyolefin.

2. The highly branched polyolefin of claim 1, wherein the one or more polyolefins are selected from the group consisting of: a high density polyethylene, a medium density polyethylene, a linear low density polyethylene, a low density polyethylene, a very low density polyethylene, an ultra-high molecular weight polyethylene, and an ultra-low molecular weight polyethylene.

3. The highly branched polyolefin of claim 2, wherein the one or more polyolefins are selected from the group consisting of: a polypropylene, a plastomer, an ethylene/propylene rubber, an ethylene propylene diene rubber, a random copolymer, or an impact copolymer.

4. The highly branched polyolefin of claim 1, wherein the one or more polyolefins are polymers comprising ethylene derived units and having a density of at least 0.910 g/cm³.

5. The highly branched polyolefin of claim 1, wherein the modifying polymer is one or more of poly(phenylene oxide), polystyrene, styrene-ethylene-butene-1-styrene rubber, styrene-isoprene-styrene rubber, styrene-ethylene-propylene-styrene rubber, and styrene-butadiene-styrene rubber.

6. The highly branched polyolefin of claim 1, wherein the one or more polyolefins comprise at least 10 wt % ethylene derived units.

7. The highly branched polyolefin of claim 1, wherein the one or more polyolefins are linear low density polyethylene.

8. The highly branched polyolefin of claim 1, wherein the one or more polyolefins comprise about 0.1 wt % to about 4.0 wt % of the multifunctional monomer derived units, based on total weight of the branched polyolefin.

9. A homogenous polymer blend comprising:
   (i) from about 1 wt % to about 90 wt % of a highly branched polyolefin, based on the total weight of polymers in the blend comprising from about 0.1 wt % to about 4.0 wt % of at least one multi-functional monomer units derived from 3,9-divinyl-2,4,8,10-tetraoxaspiro[5,5]undecane;
   (ii) from about 10 wt % to about 99 wt % of a base polymer comprising a $C_2$ to $C_{20}$ polyalphaolefin, based on the total weight of the polymers in the blend; wherein the base polymer component has a g'(vis) of greater than 0.91; and
   wherein the highly branched polyolefin has:
   (a) a branching index, g'(vis), of less than about 0.7;
   (b) a phase angle, θ, of less than about 55 degrees at a complex modulus of 10 kPa, measured at 190° C.;
   (c) a gel content of less than or equal to about 10%; and
   (d) a melting point of less than about 135° C.

10. The polymer blend of claim 9, wherein the base polymer is a linear polymer comprising ethylene derived units and has a density of at least 0.910 g/cm³.

11. The polymer blend of claim 9, wherein the base polymer is a linear low density polyethylene or a high density polyethylene.

12. The polymer blend of claim 9, wherein the base polymer has an $M_w$ of 50,000 g/mol or more, a g'(vis) of 0.95 or more and an $M_w/M_n$ of from 1 to 10 and comprises from 50 mol % to 100 mol % ethylene and from 0 mol % to 50 mol % of $C_3$ to $C_{40}$ comonomer.

13. The polymer blend of claim 9, wherein the base polymer is a polymer of an ethylene and at least one alpha olefin having 5 to 20 carbon atoms, where the modifying polymer component has a melt index, 190° C./2.16 kg, of from 0.1 to 15 dg/min; a CDBI of at least 70%, a density of from 0.910 to 0.930 g/cm³; a haze value of less than 20; a melt index ratio of from 35 to 80; an averaged modulus, M, of from 20,000 to 60,000 psi and a relation between M and the dart impact strength in g/mil, DIS, complying with the formula:

$$DIS \geq 0.8[100+\exp(11.71-0.000268M+2.183\times 10^{-9}M^2)].$$

14. The polymer blend of claim 9, wherein the base polymer is a polyethylene having a density of 0.940 g/cm³ or more.

15. The polymer blend of claim 9, wherein the polymer blend has a phase angle, δ, of about 79° or less at a complex modulus of 10 kPa at 190° C.; a degree of shear thinning of greater than or equal to 0.65 at 190° C.

16. A homogeneous polymer blend comprising:
  (i) from about 10 wt % to about 99 wt % of polyethylene;
  (ii) from about 1 wt % to about 90 wt % of a polyethylene comprising from about 0.1 wt % to about 4.0 wt % of at least one multi-functional monomer units derived from 3,9-divinyl-2,4,8,10-tetraoxaspiro[5,5]undecane; and
  (iii) from 0 wt % to about 90 wt % of a copolymer of polyethylene and a dissimilar polymer.

17. The homogeneous blend of claim 16, wherein the dissimilar polymer is one of polypropylene, random copolymer, polystyrene, styrene/ethylene/butene-1/styrene block copolymer, poly(phenylene oxide), styrene ethylene propylene styrene block copolymer, ethylene-propylene copolymer, or ethylene propylene diene rubber.

18. An article comprising the polymer of claim 1 or the polymer blend of claim 9.

* * * * *